(12) United States Patent
Iwai et al.

(10) Patent No.: US 11,006,289 B2
(45) Date of Patent: *May 11, 2021

(54) COMMUNICATION SYSTEM, SERVICE COMMON APPARATUS, MOBILE NETWORK NODE APPARATUS, AND DATA COMMUNICATION METHOD

(71) Applicant: NEC CORPORATION, Tokyo (JP)

(72) Inventors: Takanori Iwai, Tokyo (JP); Tetsuo Inoue, Tokyo (JP); Norio Uchida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 47 days.

This patent is subject to a terminal disclaimer.

(21) Appl. No.: 16/439,025

(22) Filed: Jun. 12, 2019

(65) Prior Publication Data
US 2019/0297511 A1 Sep. 26, 2019

Related U.S. Application Data

(63) Continuation of application No. 15/024,050, filed as application No. PCT/JP2014/003288 on Jun. 19, 2014, now Pat. No. 10,362,495.

(30) Foreign Application Priority Data

Sep. 27, 2013 (JP) ................................ 2013-202773

(51) Int. Cl.
*H04W 4/00* (2018.01)
*H04W 24/02* (2009.01)
(Continued)

(52) U.S. Cl.
CPC ............. *H04W 24/02* (2013.01); *H04M 3/42* (2013.01); *H04W 8/08* (2013.01); *H04W 8/20* (2013.01);
(Continued)

(58) Field of Classification Search
CPC ..... H04W 24/02; H04W 8/08; H04W 64/006; H04W 8/20; H04W 8/22; H04W 4/005; H04M 3/42
See application file for complete search history.

(56) References Cited

U.S. PATENT DOCUMENTS 9,072,074 B1 * 6/2015 Dowens ............ H04M 3/42348
2003/0105864 A1 6/2003 Mulligan et al.
(Continued)

FOREIGN PATENT DOCUMENTS

CN 102137383 A 7/2011
CN 104919825 A 9/2015
(Continued)

OTHER PUBLICATIONS

International Search Report for PCT/JP2014/003288 dated Sep. 16, 2014.
(Continued)

*Primary Examiner* — Lan-Huong Truong

(57) ABSTRACT

The present invention aims to provide a communication system capable of optimizing network processing. The communication system according to the present invention includes an application server (10) configured to detect a behavior of a communication terminal (50) and a service common apparatus (20) configured to receive an identifier of the communication terminal (50) and behavior information on the communication terminal (50) transmitted from the application server (10) via a first interface defined between the service common apparatus (20) and the application server (10) and to transmit the identifier of the communication terminal (50) and the behavior information on the communication terminal (50) to a mobile network node (40) via a second interface defined between the service common
(Continued)

apparatus (20) and the mobile network node (40) to optimize a parameter regarding the communication terminal (50).

9 Claims, 26 Drawing Sheets

(51) Int. Cl.
    *H04M 3/42* (2006.01)
    *H04W 8/22* (2009.01)
    *H04W 8/20* (2009.01)
    *H04W 64/00* (2009.01)
    *H04W 8/08* (2009.01)
    *H04W 4/70* (2018.01)

(52) U.S. Cl.
    CPC ........... *H04W 8/22* (2013.01); *H04W 64/006* (2013.01); *H04W 4/70* (2018.02)

(56) References Cited

U.S. PATENT DOCUMENTS

| | | | |
|---|---|---|---|
| 2008/0119209 A1* | 5/2008 | Upp | H04W 68/02 455/458 |
| 2009/0031384 A1 | 1/2009 | Brooks et al. | |
| 2010/0273507 A1 | 10/2010 | Coupe et al. | |
| 2011/0269447 A1* | 11/2011 | Bienas | H04W 8/22 455/422.1 |
| 2012/0131095 A1 | 5/2012 | Luna | |
| 2012/0170451 A1 | 7/2012 | Viswanathan et al. | |
| 2013/0091239 A1* | 4/2013 | Hao | H04L 29/06326 709/217 |
| 2013/0196653 A1 | 8/2013 | Morrison | |
| 2014/0362713 A1 | 12/2014 | Agarwal et al. | |
| 2015/0358837 A1 | 12/2015 | Iwai | |
| 2015/0373528 A1 | 12/2015 | Iwai | |
| 2016/0227471 A1 | 8/2016 | De Foy et al. | |

FOREIGN PATENT DOCUMENTS

| | | |
|---|---|---|
| CN | 104995972 A | 10/2015 |
| JP | 11-261724 A | 9/1999 |
| JP | 2006-295467 A | 10/2006 |
| JP | 2008-154225 A | 7/2008 |
| JP | 2011-146978 A | 7/2011 |
| WO | 2012/033342 A2 | 3/2012 |
| WO | 2012063324 A1 | 5/2012 |
| WO | 2013/108319 A1 | 7/2013 |
| WO | 2013/108322 A1 | 7/2013 |
| WO | 2013/140743 A1 | 9/2013 |

OTHER PUBLICATIONS

Communication dated Mar. 5, 2019 by the Intellectual Property Office of the P.R.C. in application No. 201480053067.X.
Communication dated Aug. 1, 2018 from the State Intellectual Property Office of the P.R.C. in counterpart Application No. 201480053067.X.
Communication dated Jul. 10, 2018 from the Japanese Patent Office in counterpart Application No. 2015-538844.
3GPP TS 22.368 V11.3.0 (Sep. 2011) 3rd Generation Partnership Project; Technical Specification Group Services and System Aspects; Service requirements for Machine-Type Communications(MTC);Stage 1 (Release 11).
Communication dated Apr. 26, 2017 from the European Patent Office in counterpart Application No. 14847810.0.
Communication dated May 12, 2020 by the Japanese Patent Office in application No. 2019-008923.
Communication dated Oct. 15, 2019 from Japanese Patent Office in counterpart JP Application No. 2019-008923.

* cited by examiner

| Child Resource Name | Child Resource Type | Multiplicity | Description |
|---|---|---|---|
| <deviceTriggering> | <deviceTriggering> | 0..1 | <deviceTriggering> resource is used for triggering specific device(s) by M2M applications via appropriate underlying networks. Refer to 9.5.y+1 for more detail. |
| <deviceCharactorist ic> | <deviceCharactori stic> | 0..n | <deviceCharactoristic> resource is used for sharing device characteristics of specific devices between M2M applications and underlying networks. Refer to 9.5.y+2 for more detail. |
| <areaService> | <areaService> | 0..n | <areaService> resource is used for accessing service based on specific geographical area from M2M applications to underlying networks. Refer to 9.5.y+3 for more detail. |
| <groupService> | <groupService> | 0..n | <groupService> resource is used for accessing service based on specific group of M2M devices from M2M applications to underlying networks. Refer to 9.5.y+4 for more detail. |
| <subscription> | <subscription> | 0..n | <subscription> resource is used to subscribe for notifying updation of current level of resource to be subscribed by any of AE or CSE. In <serviceExposure> resource, <subscription> resource shall be used for notifying announcement of newly added exposed service by underlying networks to M2M applications. |

Fig. 6

| Attribute Name | Multiplicity | RW/RO/WO | Description |
|---|---|---|---|
| expirationTime | 1 | RW | XRef <section> where the common attribute is described. |
| accessRightID | 1..n | RO | XRef <section> where the common attribute is described. |
| creationTime | 1 | RW | XRef <section> where the common attribute is described. |
| lastModifiedTime | 1 | RO | XRef <section> where the common attribute is described. |
| targetIdentifier | 1 | RW | This attribute is the target identifier of a specific device or a specific group of devices. For example, an external identifier or an external group identifier is used for 3GPP devices. |
| mobilityCharacteristic | 0..1 | RW | This attribute is a device characteristic for mobility. Three types are utilized as stopping, low mobility, and high mobility. |
| mobilityArea | 0..1 | RW | This attribute is a device characteristic for geographical area of mobility. |
| mobilityDestination | 0..1 | RW | This attribute is a device characteristic for the destination of mobility. |
| averageBandwidth usage | 0..1 | RW | This attribute is a device characteristic for the average bandwidth of usage. |
| averageTimecommunication | 0..1 | RW | This attribute is a device characteristic for the average time of communication (or manipulation). |

Fig. 7

| Attribute Name | Multiplicity | RW/RO/WO | Description |
|---|---|---|---|
| averageIntervalcommunications | 0..1 | RW | This attribute is a device characteristic for the average interval between communications. |
| averageDelaytime | 0..1 | RW | This attribute is a device characteristic for the average delay time. |
| scheduleCommunications | 0..1 | RW | This attribute is a device characteristic for the schedule of communications. |
| powercomsumptionRemained | 0..1 | RW | This attribute is a device characteristic for the remainded power with percentage. |
| powercomsumptionMode | 0..1 | RW | This attribute is a device characteristic for the mode of power consumption. Two modes are available as powerSaving and powerCharging. |
| radiosignalInformation | 0..1 | RW | This attribute is a device characteristic for the reception status information of the radio signal. |
| bootedApplications | 0..n | RW | This attribute is a device characteristic for information of the booted applications on the device. |

Fig. 8

| Attribute Name | Description |
|---|---|
| expirationTime | XRef <section> where the common attribute is described. |
| accessRightID | XRef <section> where the common attribute is described. |
| creationTime | XRef <section> where the common attribute is described. |
| lastModifiedTime | XRef <section> where the common attribute is described. |
| Message Body | a datum to be sent to M2M Devices. A string is expected in many cases, but any other format may be specified. |
| Geographic Area | a set of values to specify a geographic area in which the Underlying Network broadcasts/multicasts the data.<br>e.g. a circle (center, radius), ellipse (two focuses, long radius, short radius), rectangle (four points), polygon (multiple points), belt (center, width, length) with latitudes and longitudes, or Area ID pre-shared between the hosting CSE and the ASE. |
| Duration Parameters | a set of values to specify how many times, how long the Underlying Network repeats broadcasting/multicasting the data. Since broadcasting/multicasting is usually one-way communication, it should be repeated a few times.<br>e.g. the number of times, interval, delay tolerance, expiration timer, and misc. |

Fig. 9

| Attribute Name | Description |
|---|---|
| Method | a value/string to specify which mechanism/technology is to be used in the Underlying Network to broadcast/multicast the data.<br>e.g. CBS, MBMS, or any others |
| Radio Bearer | a value/string to specify which radio bearer is to be used in the Underlying Network to broadcast/multicast the data.<br>e.g. UMTS, GMS, etc. |
| NSE | a list of NSEs which the hosting CSE should request to broadcast/multicast the data. |
| Message Category | This attribute is a device characteristic for the remainded power with percentage. |
| powercomsumptionMode | a hinting value to specify which kind of content is stored in the Message Body.<br>e.g. 1: Disaster, 2: Security, 3: Medical affairs, 4: Transportation, 5: Energy, 6: Weather, 7: Advertising |
| Acknowledgement | a binary flag (TRUE of FALSE) to specify if the M2M Device have to acknowledge the received data. |
| Device Action | a value to specify the action of M2M Devices when they received the Message Body.<br>e.g. Beep, pop-up a message, etc. |

Fig. 10

| Child Resource Name | Child Resource Type | Multiplicity | Description |
|---|---|---|---|
| <triggerResult> | <triggerResult> | 0..1 | <triggerResult> resource is used to store the result of device triggering in the underlying network. If the originator AE subscribes on the <subscription> resource in advance, the notification shall be delivered to the AE when the <triggerResult> resource is updated. |
| <subscription> | <subscription> | 0..1 | <subscription> resource is used to subscribe for notifying updation of current level of resource to be subscribed by any of AE or CSE. In <deviceTriggering> resource, <subscription> resource shall be used for notifying the triggering result to M2M applications. |

Fig. 11

| Attribute Name | Multiplicity | RW/RO/WO | Description |
|---|---|---|---|
| expirationTime | 1 | RW | XRef <section> where the common attribute is described. |
| accessRightID | 1..n | RO | XRef <section> where the common attribute is described. |
| creationTime | 1 | RW | XRef <section> where the common attribute is described. |
| lastModifiedTime | 1 | RO | XRef <section> where the common attribute is described. |
| targetIdentifier | 1 | RW | This attribute is the target identifier of a specific device. For example, an external identifier or a MSISDN is used for 3GPP devices. |
| triggerPayload | 1 | RW | This attribute contains the triggering payload to be delivered to the specified target identifier. This is type of octed string. |
| priorityIndication | 0..1 | RW | This attribute is used to indicate priority of device triggering. Either of Non-priority or Priority can be indicated. |
| applicationPortIde ntifier | 0..1 | RW | This attribute is used to specify the triggering application addressed in the target device. Refer to 3GPP Tsp protocol specification (ref.[i+1]) for more detail. |
| validityTime | 0..1 | RW | This attribute is used to specify a validity time in seconds for waiting of device triggering transaction. Refer to 3GPP Tsp protocol specification (ref.[i+1]) for more detail. |

Fig. 12

| Attribute Name | Multiplicity | RW/RO/WO | Description |
|---|---|---|---|
| expirationTime | 1 | RW | XRef <section> where the common attribute is described. |
| accessRightID | 1..n | RO | XRef <section> where the common attribute is described. |
| creationTime | 1 | RW | XRef <section> where the common attribute is described. |
| lastModifiedTime | 1 | RO | XRef <section> where the common attribute is described. |
| targetIdentifier | 1 | RO | This attribute is the target identifier of a specific device for the original request. For example, the external identifier or the MSISDN is used for 3GPP devices. |
| requestStatus | 0..1 | RO | This attribute is used to specify the result of device triggering in case the triggering action could not be performed in 3GPP network by some reason. Refer to 3GPP Tsp protocol specification (ref.[i+1]) for more detail. |
| deliverlyOutcome | 0..1 | RO | This attribute is used to specify the result of device triggering in case the triggering action could be performed in 3GPP network but it was failure by some reason. Refer to 3GPP Tsp protocol specification (ref.[i+1]) for more detail. |

Fig. 13

COMMUNICATION SYSTEM, SERVICE COMMON APPARATUS, MOBILE NETWORK NODE APPARATUS, AND DATA COMMUNICATION METHOD

CROSS REFERENCE TO RELATED APPLICATIONS

This application is a continuation of U.S. application Ser. No. 15/024,050 filed Mar. 23, 2016, which is a National Stage of International Application No. PCT/JP2014/003288 filed Jun. 19, 2014, claiming priority based on Japanese Patent Application No. 2013-202773 filed Sep. 27, 2013, the contents of all of which are incorporated herein by reference in their entirety.

TECHNICAL FIELD

The present invention relates to a communication system, a service common apparatus, a mobile network node apparatus, a data communication method, and a program, and more particularly, to a communication system, a service common apparatus, a mobile network node apparatus, a data communication method, and a program that optimize parameters of a communication terminal.

BACKGROUND ART

In recent years, a method of optimizing a setting of each processing node which makes up a mobile communication system has been demanded. 3GPP proposes a method of optimizing network processing according to use characteristics of a mobile communication terminal (Non-Patent Literature 1). For example, network processing may be executed with respect to a terminal located by being fixed to a specific location to reduce control processing related to a move. More specifically, an interval when the terminal executes position registration may be set longer than a predetermined time. Furthermore, when a mobile communication terminal is a terminal which allows a delay, network processing may be executed to transmit data to the mobile terminal by controlling a communication time and avoiding a timing when a data transmission/reception amount comes to a peak.

CITATION LIST

Non Patent Literature

[Non-Patent Literature 1] 3GPP TS 22.368 V11.3.0 (2011-09) 3rd Generation Partnership Project; Technical Specification Group Services and System Aspects; Service requirements for Machine-Type Communications(MTC); Stage 1 (Release 11)

SUMMARY OF INVENTION

Technical Problem

However, as described above, network processing is optimized targeting at a mobile terminal whose use characteristics are fixed. For example, whether the mobile terminal is a terminal located by being fixed to a specific location or a terminal which allows a delay is determined using service information on the terminal, terminal information or the like determined in advance. Currently, besides optimization of the network processing as described above, optimization of network processing targeting at a mobile terminal whose use characteristics change is being demanded. Hence, executing optimization of network processing using information other than service information which generally changes less frequently is demanded.

One exemplary object of the present invention is to provide a communication system, a service common apparatus, a mobile network node apparatus, a data communication method, and a program capable of optimizing network processing using information other than service information which generally changes less frequently in order to solve the aforementioned problems.

Solution to Problem

A communication system according to a first exemplary aspect of the present invention includes: an application server configured to detect a behavior of a communication terminal; and a service common apparatus configured to receive an identifier of the communication terminal and behavior information on the communication terminal transmitted from the application server via a first interface defined between the service common apparatus and the application server and to transmit the identifier of the communication terminal and the behavior information on the communication terminal to a mobile network node apparatus via a second interface defined between the service common apparatus and the mobile network node apparatus to optimize a parameter regarding the communication terminal.

A service common apparatus according to a second exemplary aspect of the present invention includes communication means for receiving an identifier of a communication terminal and behavior information on the communication terminal transmitted from an application server via a first interface defined between the service common apparatus and the application server configured to detect a behavior of the communication terminal and transmitting the identifier of the communication terminal and the behavior information on the communication terminal to a mobile network node apparatus via a second interface defined between the service common apparatus and the mobile network node apparatus to optimize a parameter regarding the communication terminal.

A mobile network node apparatus according to a third exemplary aspect of the present invention acquires, from a service common apparatus that has received an identifier of a communication terminal and behavior information on the communication terminal transmitted from the application server via a first interface defined between the service common apparatus and the application server configured to detect a behavior of the communication terminal, the identifier of the communication terminal and the behavior information on the communication terminal via a second interface and optimizes a parameter regarding the communication terminal.

A data communication method according to a fourth exemplary aspect of the present invention includes: receiving an identifier of a communication terminal and behavior information on the communication terminal transmitted from an application server via a first interface defined between an apparatus and the application server configured to detect a behavior of the communication terminal; and transmitting the identifier of the communication terminal and the behavior information on the communication terminal to a mobile network node apparatus via a second interface defined between the apparatus and the mobile network node apparatus to optimize a parameter regarding the communication terminal.

A program according to a fifth exemplary aspect of the present invention is a program for causing a computer to execute the processes of: receiving an identifier of a communication terminal and behavior information on the communication terminal transmitted from an application server via a first interface defined between an apparatus and the application server configured to detect a behavior of the communication terminal; and transmitting the identifier of the communication terminal and the behavior information on the communication terminal to a mobile network node apparatus via a second interface defined between the apparatus and the mobile network node apparatus to optimize a parameter regarding the communication terminal.

Advantageous Effects of Invention

According to the present invention, it is possible to provide a communication system, a service common apparatus, a mobile network node apparatus, a data communication method, and a program capable of optimizing network processing using information other than service information which generally changes less frequently.

BRIEF DESCRIPTION OF DRAWINGS

FIG. 6 is a diagram showing sub-resources of a service-Exposure Resource according to the second exemplary embodiment;

FIG. 7 is a diagram showing Attributes of a deviceCharactoristic Resource according to the second exemplary embodiment;

FIG. 8 is a diagram showing Attributes of the device-Charactoristic Resource according to the second exemplary embodiment;

FIG. 9 is a diagram showing Attributes of an areaService resource or a groupService resource according to the second exemplary embodiment;

FIG. 10 is a diagram showing Attributes of the areaService resource or the groupService resource according to the second exemplary embodiment;

FIG. 11 is a diagram showing sub-resources of a device-Triggering resource according to the second exemplary embodiment;

FIG. 12 is a diagram showing Attributes of the device-Triggering resource according to the second exemplary embodiment;

FIG. 13 is a diagram showing Attributes of a triggerResult resource according to the second exemplary embodiment;

DESCRIPTION OF EMBODIMENTS

First Exemplary Embodiment

Figure 1:
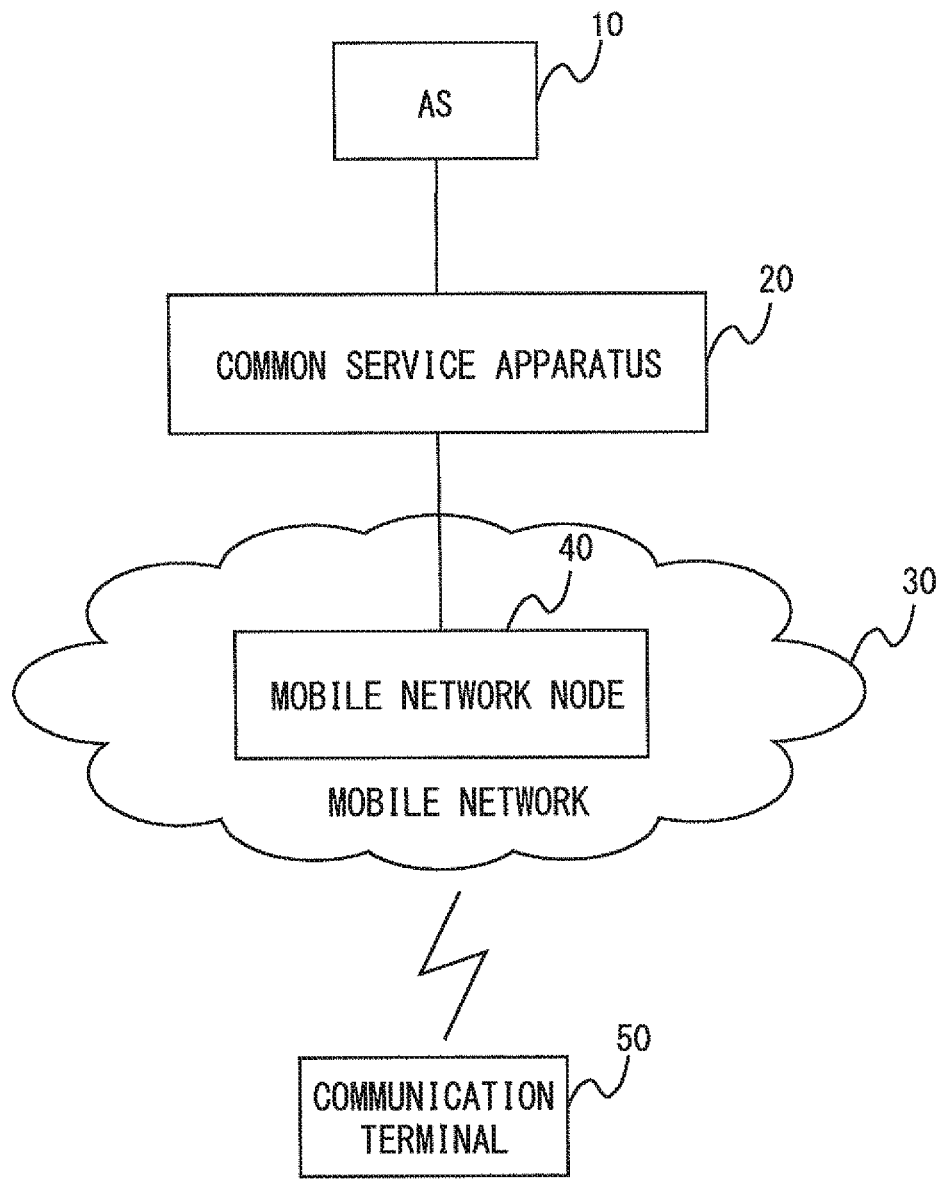
FIG. 1 is a configuration diagram of a communication network according to a first exemplary embodiment.

Hereinafter, with reference to the drawings, exemplary embodiments of the present invention will be described. With reference to FIG. 1, a configuration example of a communication system according to a first exemplary embodiment of the present invention will be described. The communication system shown in FIG. 1 includes an application server 10, a common service apparatus 20, a mobile network node 40, and a communication terminal 50. The mobile network node 40 is a device that is arranged in a mobile network 30.

The application server 10 detects a behavior of the communication terminal 50. The behavior of the communication terminal 50 may be contents indicating a moving state, a communication state or the like of the communication terminal 50. The moving state may be referred to as, for example, mobility characteristics indicating a moving speed or the like of the communication terminal 50 and the communication state may be referred to as communication characteristics indicating an average use bandwidth or the like of the communication terminal 50. In another example, the behavior of the communication terminal 50 may be, for example, contents indicating battery information on the communication terminal.

The application server 10 acquires information indicating the behavior from the communication terminal 50. For example, the application server 10 acquires information indicating the behavior of the communication terminal 50 via the mobile network 30 connected to the communication terminal 50. Alternatively, the application server 10 may acquire information indicating the behavior of the communication terminal 50 via a server that communicates with the communication terminal 50.

The mobile network 30 is a network managed by a mobile communication business operator. The mobile network 30 may be, for example, a network in which a node apparatus defined by the 3GPP is provided. Therefore, the mobile network node 40 arranged in the mobile network 30 may be a node apparatus defined by the 3GPP.

The common service apparatus 20 receives the identifier of the communication terminal 50 and information regarding the behavior of the communication terminal 50 transmitted from the application server 10 via an interface defined between the common service apparatus 20 and the application server 10. The interface defined between the common service apparatus 20 and the application server 10 may be, for example, a data format defined when a data communication is performed between the common service apparatus 20 and the application server 10.

The common service apparatus 20 transmits the identifier of the communication terminal 50 and information regarding the behavior of the communication terminal 50 to the mobile network node 40 via an interface defined between the common service apparatus 20 and the mobile network node 40 in order to optimize the parameters regarding the communication terminal 50 held in the mobile network node 40.

The optimization of the parameters related to the communication terminal 50 is, for example, to increase or decrease communication resources allocated to the communication terminal 50 according to the behavior of the communication terminal 50 in the mobile network node 40. The mobile network node 40 optimizes the parameters related to the communication terminal 50 based on the identifier of the communication terminal 50 and the information regarding the behavior of the communication terminal 50.

The interface defined between the common service apparatus 20 and the mobile network node 40 may be, for example, a data format defined when a data communication is performed between the common service apparatus 20 and the mobile network node 40.

As described above, by using the communication system according to the first exemplary embodiment of the present invention, the common service apparatus 20 is able to notify the mobile network node 40 of the information regarding the behavior of the communication terminal 50 that dynamically changes. Further, the mobile network node 40 is able to optimize the parameters related to the communication terminal 50 using the information regarding the behavior of the communication terminal 50 that frequently changes. It is therefore possible to reduce the load in the mobile network 30. For example, it is possible to improve an accommodation efficiency of the communication terminal in the mobile network 30.

Second Exemplary Embodiment

Figure 2:
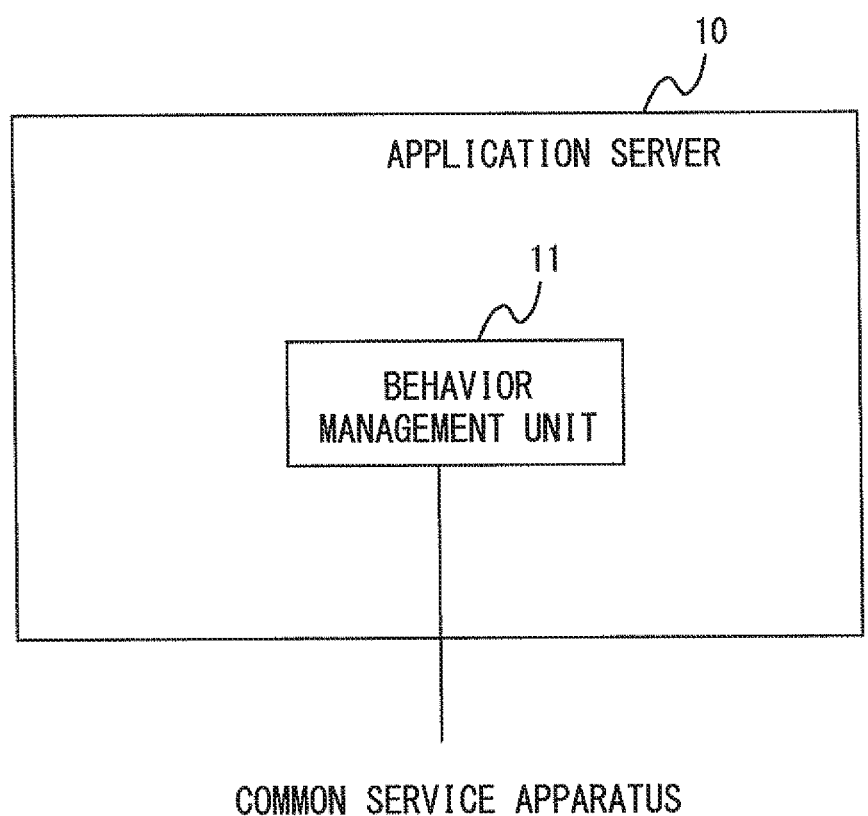
FIG. 2 is a configuration diagram of an application server according to a second exemplary embodiment.

Next, with reference to FIG. 2, a configuration example of the application server 10 according to a second exemplary embodiment of the present invention will be described. The application server 10 includes a behavior management unit 11.

The behavior management unit 11 detects the behavior of the communication terminal 50 connected to the mobile network 30. For example, the communication terminal 50 autonomously transmits information regarding the behavior to the application server 10 at a timing when the behavior in the communication terminal 50 is changed. Alternatively, the communication terminal 50 may periodically transmit information regarding the behavior of the communication terminal 50 to the application server 10. The application server 10 may detect the behavior of the communication terminal 50 by acquiring the information regarding the behavior transmitted from the communication terminal 50.

Now, the behavior of the communication terminal 50 will be described in detail. The information regarding the behavior of the communication terminal 50 includes, for example, mobility characteristics, communication characteristics, battery information and the like of the communication terminal 50. The mobility characteristics of the communication terminal 50 may be, for example, information indicating whether the communication terminal 50 is moving. Further, when the communication terminal 50 is moving, the mobility characteristics may be information indicating whether the moving speed is faster or slower than a predetermined speed.

For example, a state in which the communication terminal 50 is not moving may be referred to as a Stop state, a state in which the communication terminal 50 is moving at a speed lower than the predetermined speed may be referred to as a Low Mobility state, and a state in which the communication terminal 50 is moving at a speed higher than the predetermined speed may be referred to as a High Mobility state.

Alternatively, the mobility characteristics of the communication terminal 50 may be information indicating the moving range of the communication terminal 50. More particularly, the mobility characteristics of the communication terminal 50 may be, for example, information indicating the range in which the communication terminal 50 has moved within a predetermined period of time or may be information indicating the locus in which the communication terminal 50 has moved within a predetermined period of time. In one more alternative, the mobility characteristics of the communication terminal 50 may be information regarding the destination of the communication terminal 50.

The communication characteristics of the communication terminal 50 may be, for example, an average use bandwidth, an average communication time, an average operation time, and an average communication interval in a predetermined period of time during which the communication terminal 50 is performing communication via the mobile network 30. Alternatively, the communication characteristics of the communication terminal 50 may be information indicating a time zone in which the communication terminal 50 performs the communication. In one more alternative, the communication characteristics of the communication terminal 50 may be delay time of data allowed by the communication terminal 50.

The battery information on the communication terminal 50 may be, for example, information indicating the remaining amount of battery of the communication terminal 50. Alternatively, the battery information on the communication terminal 50 may be information indicating whether the communication terminal 50 is being charged or may be information indicating whether the communication terminal 50 is operating in a power saving mode.

In one more alternative, the information regarding the behavior of the communication terminal 50 may be information on the application which is being activated by the communication terminal 50 or may be information regarding the radio wave state of the communication terminal 50.

Upon receiving the information regarding the behavior of the communication terminal 50 including the mobility characteristics, communication characteristics, battery information or the like of the communication terminal 50 from the communication terminal 50, the behavior management unit 11 holds the acquired information.

The behavior management unit 11 transmits both the information regarding the behavior of the communication terminal 50 and the information for identifying the communication terminal 50 to the common service apparatus 20 via the interface defined between the application server 10 and the common service apparatus 20.

Figure 3:
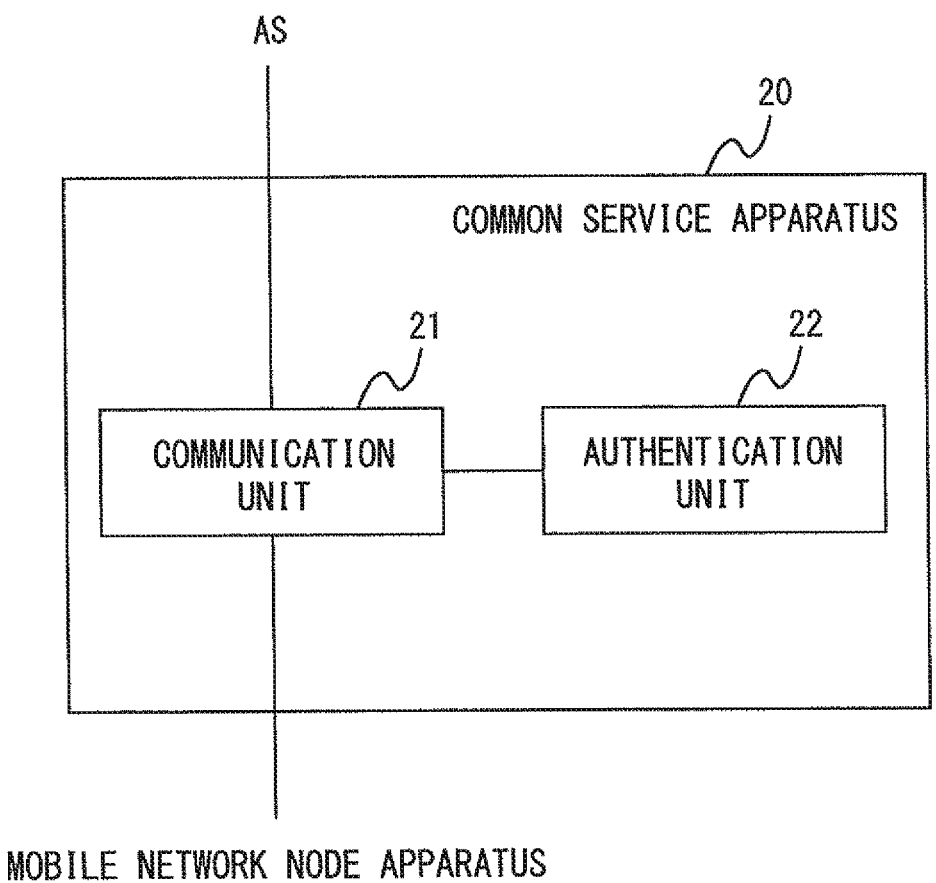
FIG. 3 is a configuration diagram of a common service apparatus according to the second exemplary embodiment.

Next, with reference to FIG. 3, a configuration example of the common service apparatus 20 according to the second exemplary embodiment of the present invention will be described. The common service apparatus 20 includes a communication unit 21 and an authentication unit 22.

The communication unit 21 receives the identifier of the communication terminal 50 and the information regarding the behavior of the communication terminal 50 transmitted from the application server 10 via the interface set between the application server 10 and the communication unit 21.

The communication unit 21 outputs the identifier of the communication terminal 50 and the information regarding the behavior of the communication terminal 50 that have been received to the authentication unit 22.

The authentication unit 22 performs authentication regarding the application server 10 using the information output from the communication unit 21.

For example, the authentication unit 22 may determine whether the application server 10 that has output the information or the like regarding the behavior of the communication terminal 50 is an application server that has been allowed in advance to connect to the common service apparatus 20. For example, the authentication unit 22 may hold information regarding a list of application servers that have been allowed in advance to connect to the common service apparatus 20.

When the authentication unit 22 does not allow the connection of the application server 10 as a result of the authentication processing, the authentication unit 22 may send a notification indicating that the connection will not be allowed to the application server 10 via the communication unit 21 or cancel the connection with the application server 10. When the authentication unit 22 allows the connection of the application server 10 as a result of the authentication processing, the authentication unit 22 may output a notification indicating the connection of the application server 10 is allowed to the communication unit 21.

When the authentication unit 22 allows the connection of the application server 10, the communication unit 21 outputs the identifier of the communication terminal 50 and information regarding the behavior of the communication terminal 50 output from the application server 10 to the mobile network node 40. The communication unit 21 converts the format of the information or the like regarding the behavior of the communication terminal 50 into a format used in the interface defined between the common service apparatus 20 and the mobile network node 40 and then outputs the information or the like to the mobile network node 40.

Figure 4:
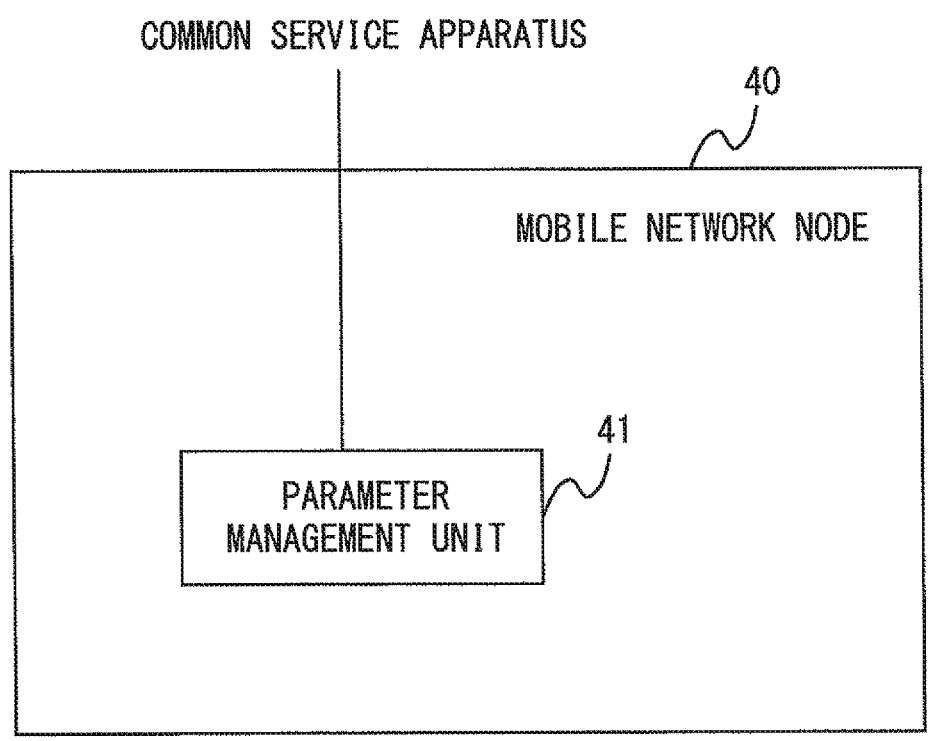
FIG. 4 is a diagram of a mobile network node according to the second exemplary embodiment.

Next, with reference to FIG. 4, a configuration example of the mobile network node 40 according to the second exemplary embodiment of the present invention will be described. The mobile network node 40 includes a parameter management unit 41.

The parameter management unit 41 receives the identifier of the communication terminal 50 and the information regarding the behavior of the communication terminal 50 transmitted from the common service apparatus 20 via the interface defined between the parameter management unit 41 and the common service apparatus 20.

The parameter management unit 41 changes parameters regarding the communication terminal 50 to optimize them based on the information transmitted from the common service apparatus 20. Now, an example regarding the optimization of the parameters regarding the communication terminal 50 will be described.

It is assumed, for example, that the parameter management unit 41 has received information regarding the behavior indicating that the communication terminal 50 is not currently moving and is stopped. In this case, the parameter management unit 41 may change the parameters defined regarding a position registration area of the communication terminal 50 to narrow the position registration area.

In general, the communication terminal 50 transmits a position registration request signal to the mobile network node 40 when it moves outside the position registration area. At this time, when the position registration area is made too narrow, the position registration request signal is transmitted to the mobile network node 40 every time the communication terminal 50 slightly moves, which may cause congestion in the mobile network node 40. When the position registration area is made too wide, the number of communication terminals 50 managed by one mobile network node 40 increases, whereby the process burden in the mobile network node 40 increases.

On the other hand, when it is detected that the communication terminal 50 is stopped, even when the position registration area, which is a parameter regarding the communication terminal 50, is made narrow, the communication terminal 50 does not frequently transmit the position registration request signal. In this way, the information regarding the communication terminal 50 managed by the parameter management unit 41 may be optimized using the information regarding the behavior of the communication terminal 50.

While the example in which the parameters of the parameter management unit 41 are changed using the mobility characteristics as the information regarding the behavior has been described above, the parameters of the parameter management unit 41 may be changed using the information regarding the behavior other than the mobility characteristics.

As described above, by using the application server 10, the common service apparatus 20, and the mobile network node 40 according to the second exemplary embodiment of the present invention, it is possible to change the parameters of the communication terminal 50 managed by the mobile network node 40 to optimize them according to the behavior of the communication terminal 50.

Third Exemplary Embodiment

Figure 5:
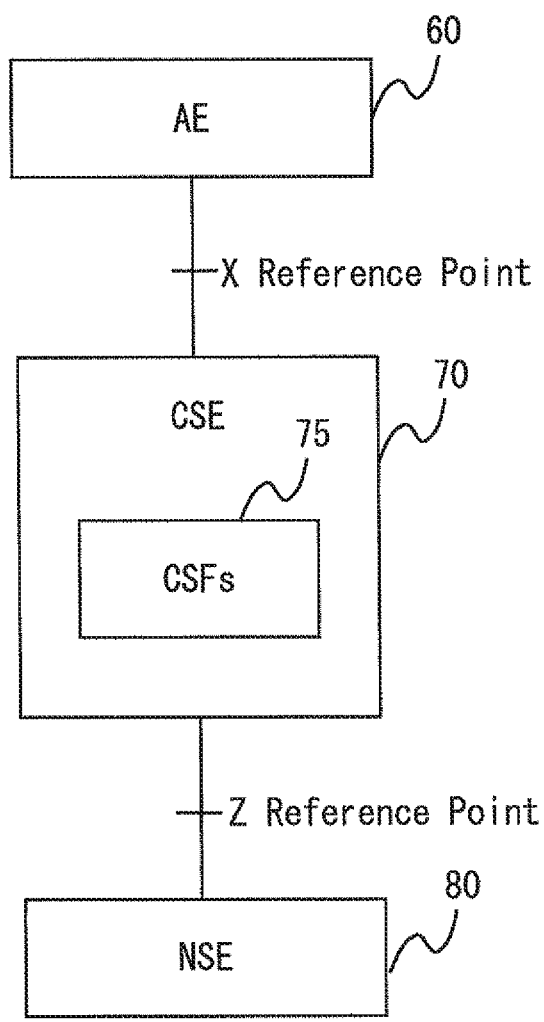
FIG. 5 is a configuration diagram of a communication network according to a third exemplary embodiment.

Next, with reference to FIG. 5, a configuration example of a communication system according to a third exemplary embodiment of the present invention will be described. The communication system shown in FIG. 5 includes an Application Entity (AE) 60, a Common Services Entity (CSE) 70, and a Network Service Entity (NSE) 80. The AE, the CSE, and the NSE are node apparatuses defined in one M2M that standardizes Machine to Machine services. The AE 60 corresponds to the application server 10 shown in FIG. 1. The CSE 70 corresponds to the common service apparatus 20 in FIG. 1. The NSE 80 corresponds to the mobile network node 40 in FIG. 1.

The CSE 50 may be a server device managed by a service provider that mediates a communication between the AE 60 and the NSE 80. Alternatively, the CSE 70 or a plurality of CSEs 70 managed by such a service provider may be referred to as a service platform.

Further, an interface between the AE 60 and the CSE 70 is defined to be an X Reference Point. Further, an interface between the CSE 70 and the NSE 80 is defined to be a Z Reference Point.

Now, a description will be given to the X Reference Point. The X Reference Point defines a common format and an M2M Devices Information-specific format that define necessary information items when the information regarding the behavior of the communication terminal 50 is transmitted from the AE 60 to the CSE 70.

The AE 60 sets a distribution destination service platform ID and a distribution source application ID in the common format. The distribution destination service platform ID is, for example, an ID that is allocated to the CSE 70. When the service provider manages a plurality of CSEs 70, the distribution destination service platform ID common to the plurality of CSEs 70 may be allocated. The distribution source application ID is an ID that is used to identify the AE 60.

The AE 60 sets the terminal ID and the information regarding the behavior of the communication terminal 50 that has transmitted the information regarding the behavior in the M2M Devices Information-specific format.

International Mobile Subscriber Identity (IMSI), which is the identifier of the terminal defined by the 3GPP, may be used as the terminal ID of the communication terminal 50. Alternatively, another identifier such as the telephone number or the like to identify the communication terminal 50 may be used as the terminal ID of the communication terminal 50.

The mobility characteristics, the communication characteristics, the battery information, or other information are set as the information regarding the behavior.

The AE 60 may not necessarily set all the information items in the M2M Devices Information-specific format and the information items described above may be divided into required items that need to be set and optional items that may be optionally set. For example, the required items may include the terminal ID of the communication terminal 50 whose parameter will be changed. Further, the items of the information regarding the behavior other than the information regarding the behavior transmitted from the communication terminal 50 may be optional items. For example, when the information regarding the mobility characteristics is transmitted from the communication terminal 50, other information such as the communication characteristics may not be set.

Next, the configuration and the function of the CSE 70 will be described. The CSE 70 includes a functional block: Common Service Functions (CSFs) 75. The CSFs 75 may be formed, for example, using a CPU or the like in the CSE 70. The CSFs 75 correspond to the communication unit 21 and the authentication unit 22 shown in FIG. 3. Hereinafter, the functions executed in the CSFs 75 will be described.

The CSFs 75 receive a message transmitted from the AE 60 via the X Reference Point. The CSFs 75 further have a function of checking the items set in the received message.

For example, the CSFs 75 determine whether the distribution source application ID corresponds to the AE that has been allowed in advance to connect to the CSE 70. For example, the CSFs 75 may hold information regarding the list of the AEs that have been allowed in advance to connect to the CSE 70. The CSFs 75 may determine whether the distribution source application ID set for the common format of the message is included in the list of the AEs that have been allowed in advance to connect to the CSE 70.

Further, the CSFs 75 may check the validity regarding the other information items of the message. For example, it is assumed that it is allowed for the AE 60 to set only the mobility characteristics as the optional items. The optional items that the AE 60 can set may be defined, for example, in a contract or the like between the operator that manages the AE 60 and the operator that manages the CSE 70. Further, the CSFs 75 may hold contract information between operators. In such a case, when the communication characteristics are set as the optional items of the message transmitted from the AE 60, the CSFs 75 may discard the message transmitted from the AE 60 as an unauthorized message.

Alternatively, it is assumed in the AE 60 that the terminal ID that can be set as the required item is predetermined. In such a case, when a terminal ID other than the terminal ID that has been determined in advance is set as the required item of the message transmitted from the AE 60, the CSFs 75 may discard the message that has been transmitted from the AE 60 as an unauthorized message.

The CSFs 75 transmit the message to the NSE 80 via the Z Reference Point after completing the check of the message. Further, when a plurality of NSEs 80 are connected to the CSE 70, the CSFs 75 select the NSE to which the message is to be transmitted and transmit the message to the NSE that has been selected.

For example, the CSFs 75 may search for the NSE 80 in the plurality of NSEs 80 that holds the parameters regarding the terminal ID set in the message transmitted from the AE 60 and select the NSE 80 that has been extracted. The CSFs 75 may transmit the terminal ID whose parameter will be changed to each NSE 80 and specify the NSE 80 that holds the parameters regarding the terminal ID using a response signal.

When the message is transmitted to the NSE 80, the CSFs 75 change the format of the message transmitted from the AE 60 to the format used in the NSE 80 and transmit the message whose format has been changed to the NSE 80. The format used in the NSE 80 is defined as the Z Reference Point. The Z Reference Point defines the common format and the M2M Devices Information format that define the necessary information item when the message is transmitted from the CSE 70 to the NSE 80.

The CSFs 75 set a distribution destination network ID and a distribution source service platform ID in the common format. The distribution destination network ID is, for example, an ID allocated to the NSE 80. The distribution source service platform ID is an ID used to identify the CSE 70.

Since the information item set in the M2M Devices Information format defined in the Z Reference Point is basically similar to the information item set in the M2M Devices Information format defined in the X Reference Point, detailed descriptions thereof will be omitted.

Further, the CSFs 75 may analyze the information regarding the behavior transmitted from the AE 60, set the result of the analysis in the M2M Devices Information format, and transmit it to the NSE 80. For example, upon receiving a message in which it is set that the communication terminal is stopped from the AE 60, the CSFs 75 may set contents to instruct to narrow the position registration area in the NSE 80 in the M2M Devices Information format.

Besides the above functions, the CSFs 75 may execute charging processing. The charging processing may be, for example, processing of generating charging information when information is distributed using the NSE 80 when the CSFs 75 receive a message from the AE 60.

Now, specific examples of the CSFs will be described. The CSFs are the general term for a plurality of functions. One of the plurality of functions includes Network Service Exposure, Service Execution and Triggering (NSE) CSF. The NSE CSF manages a plurality of resources. The plurality of resources are updated, for example, in the AE. The NSE CSF notifies the NSE of the information that has been updated when the resource managed by the AE is updated via the X Reference Point. The resources managed by the NSE CSF will be described below.

The NSE CSF manages serviceExposure resource for M2M Applications. Further, the NSE CSF manages the following resources as sub-resources (child resources) of the serviceExposure resource for M2M Applications.

deviceTriggering resource as a child resource of service-Exposure resource
deviceCharacteristic resource as a child resource of serviceExposure resource
locationNotification resource as a child resource of serviceExposure resource
policyRule resource as a child resource of serviceExposure resource
locationQuery resource as a child resource of serviceExposure resource
imsService resource as a child resource of serviceExposure resource
deviceManagement resource as a child resource of serviceExposure resource
areaService resource as a child resource of serviceExposure resource
groupService resource as a child resource of serviceExposure resource
underlyingNetwork resource for the CSE operation purpose
collection of underlyingNetwork resources
linkManagement resource as a child resource of underlyingNetwork resource
linkCredential resource as a child resource of linkManagement resource The information items such as the mobility characteristics, the communication characteristics, the battery information or other information set in the M2M Devices Information-specific format are set to one of the above sub-resources.

The deviceTriggering resource, the deviceCharacteristic resource, the areaService resource, the groupService resource, and a subscription resource, which is not described in the above sub-resources, have the functions shown in FIG. 6.

For example, the deviceTriggering resource is a resource that manages a timing when the AE 40 notifies the NSE 60 of the execution of the service. The deviceCharacteristic resource is a resource, for example, that manages characteristics of the communication terminal connected to the NSE 60. The areaService resource is a resource that manages the delivery area. The groupService resource is a resource that manages the group of the communication terminals to which the information will be distributed. The subscription resource is a resource that is used to notify the AE 40 of the resource that has been updated when one of the sub-resources is updated. When the subscription resource is included, a bidirectional communication between the AE 40 and the NSE 60 can be achieved.

Further, the deviceCharacteristic resource has Attributes shown in the list of FIGS. 7 and 8. Further, the areaService resource or the groupService resource has Attributes shown in the lists of FIGS. 9 and 10. Further, the deviceTriggering resource has a triggerResult resource as a sub-resource, as shown in FIG. 11. The deviceTriggering resource has Attributes shown in the list of FIG. 12. Further, the triggerResult resource, which is a sub-resource of the deviceTriggering resource, has Attributes shown in the list of FIG. 13.

When the AE 40 updates the resources such as the deviceCharacteristic resource, the areaService resource, the groupService resource, and the deviceTriggering resource, the CSE 50 selects the NSE 60 to which the information will be sent. The CSE 50 determines, for example, whether the NSE is the NSE to which the information regarding the resource that has been updated needs to be sent and selects the NSE 60. Alternatively, the NSE 60 may be selected based on policy information or the like. The CSE 50 notifies the NSE 60 that has been selected of the information regarding the resources that have been updated.

Further, the CSE 50 is mounted on one of an Application Service Node (ASN) such as a communication terminal, a Middle Node (MN) such as a router, and an Infrastructure Node (IN) such as a service platform. The interface used between the CSE 50 and the NSE or information to be sent to the NSE vary depending on which one of the ASN, the MN, and the IN the CSE 50 is mounted on. The CSE 50 may therefore have a function of identifying which one of the ASN, the MN, and the IN the CSE 50 is mounted on. This function may be achieved by a CPU or the like that executes a program stored in a memory.

A case in which the CSE 50 is mounted on the IN will now be described. In this case, the CSE 50 may select the interface from an OMA, a GSMA OneAPI framework and the like when it communicates with the NSE. Further, the CSE 50 may request the NSE 60 to execute the following functions when the sub-resources included in the service-Expo sure resource are updated.

IP Multimedia communications
Messaging
Location
Charging and billing services
Device information and profiles
Configuration and management of devices
Triggering, monitoring of devices
Small data transmission
Group management For example, when the deviceTriggering resource is updated, the CSE 50 may request the NSE 60 to execute functions regarding Triggering and Small data transmission. When the deviceCharacteristic resource is updated, the CSE 50 may request the NSE 60 to execute the function regarding the Device information and profiles. When the locationNotification resource is updated, the CSE 50 may request the NSE 60 to execute the function regarding the Location. When the policyRule resource is updated, the CSE 50 may request the NSE 60 to execute the function regarding the Charging and billing services. When the locationQuery resource is updated, the CSE 50 may request the NSE 60 to execute the function regarding the Location. When the imsService resource is updated, the CSE 50 may request the NSE 60 to execute the function regarding the IP Multimedia communications. When the deviceManagement resource is updated, the CSE 50 may request the NSE 60 to execute the function regarding the Configuration and management of devices. When the groupService resource is updated, the CSE 50 may request the NSE 60 to execute the function regarding the Group management.

Figure 14:
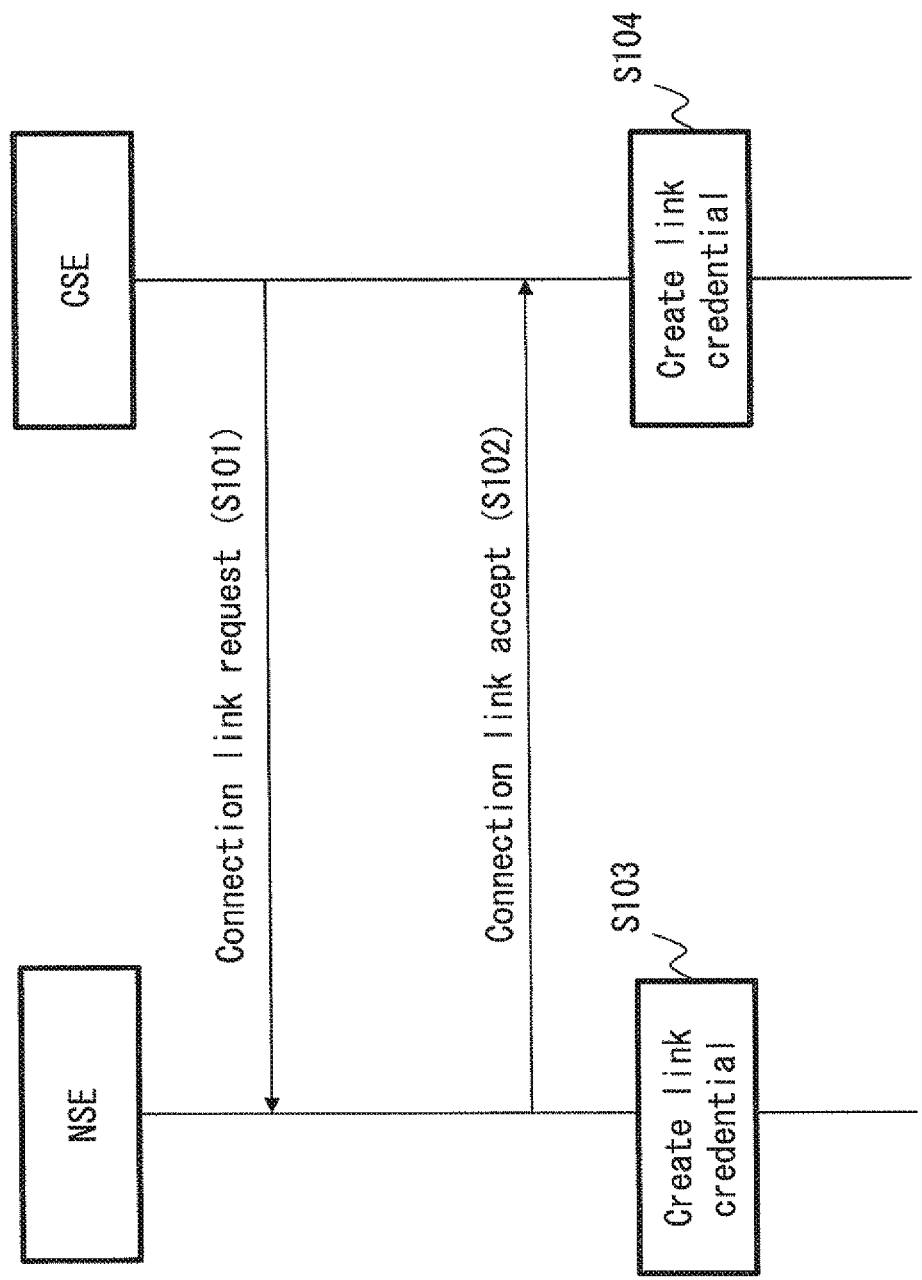
FIG. 14 is a diagram for describing a link connection procedure in a Z Reference Point according to the second exemplary embodiment.

Next, with reference to FIG. 14, the link connection procedure in the Z Reference Point will be described. First, the CSE 50 transmits a Connection link request message to the NSE 60 (S101). Next, the NSE 60 transmits a Connection link accept message as a response message (S102). After the messages in Steps S101 and S102 have been sent, each of the NSE 60 and the CSE 50 executes link setting processing (Create link credential) (S103, S104).

Figure 15:
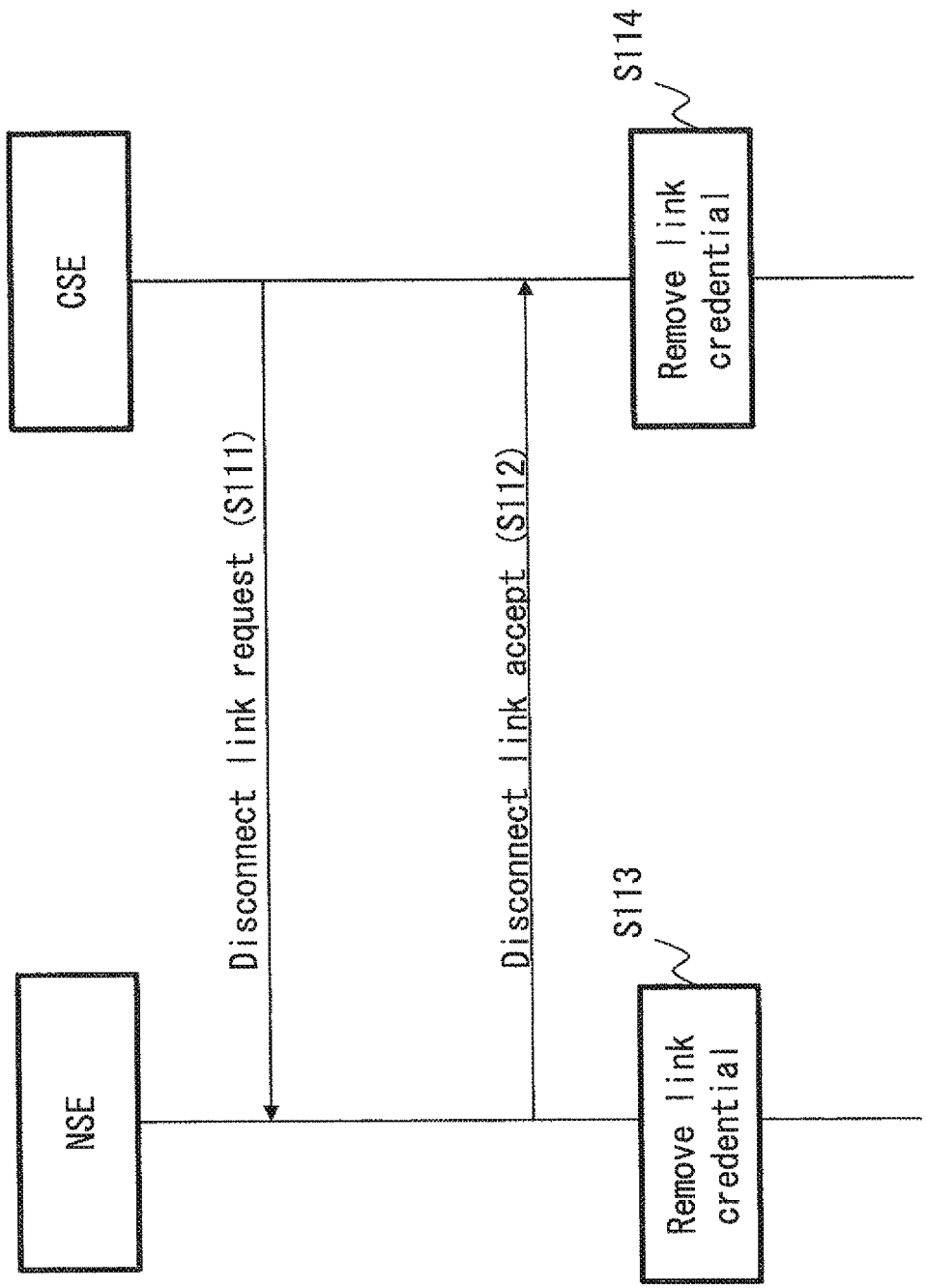
FIG. 15 is a diagram for describing a link disconnection procedure in the Z Reference Point according to the second exemplary embodiment.

Next, with reference to FIG. 15, a link disconnection procedure in the Z Reference Point will be described. First, the CSE 50 transmits a Disconnect link request message to the NSE 60 (S111). Next, the NSE 60 transmits a Disconnect link accept message as a response message (S112). After the messages in Steps S111 and S112 have been sent, each of the NSE 60 and the CSE 50 carries out link disconnection processing (Remove link credential) (S113, S114).

Figure 16:
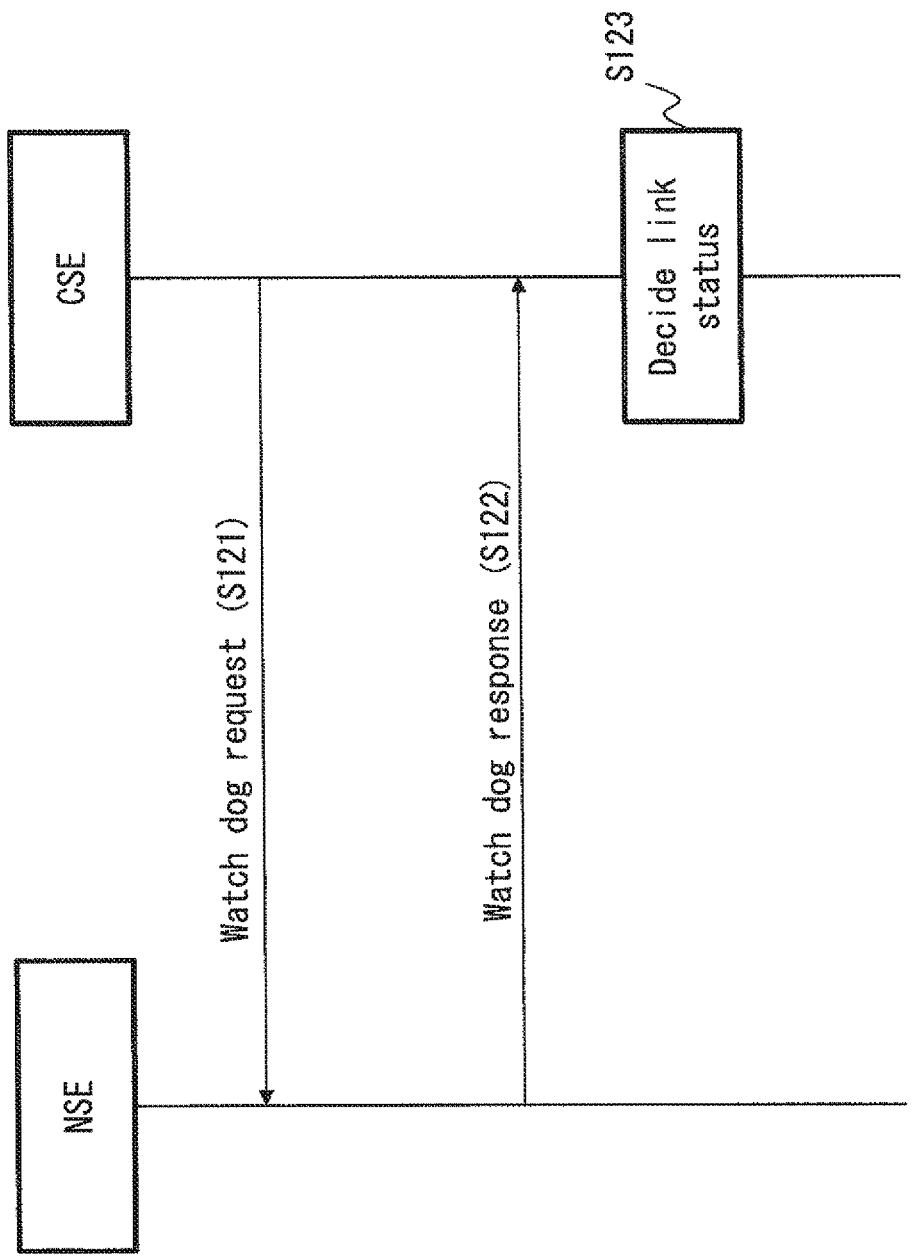
FIG. 16 is a diagram for describing a link monitoring procedure in the Z Reference Point according to the second exemplary embodiment.

Next, with reference to FIG. 16, a link monitoring procedure in the Z Reference Point will be described. First, the CSE 50 transmits a Watch dog request message to the NSE 60 (S121). Next, the NSE 60 transmits a Watch dog response message as a response message (S122). Next, the CSE 50 determines the link state between the CSE 50 and the NSE 60 based on the Watch dog response message (S123).

Figure 17:
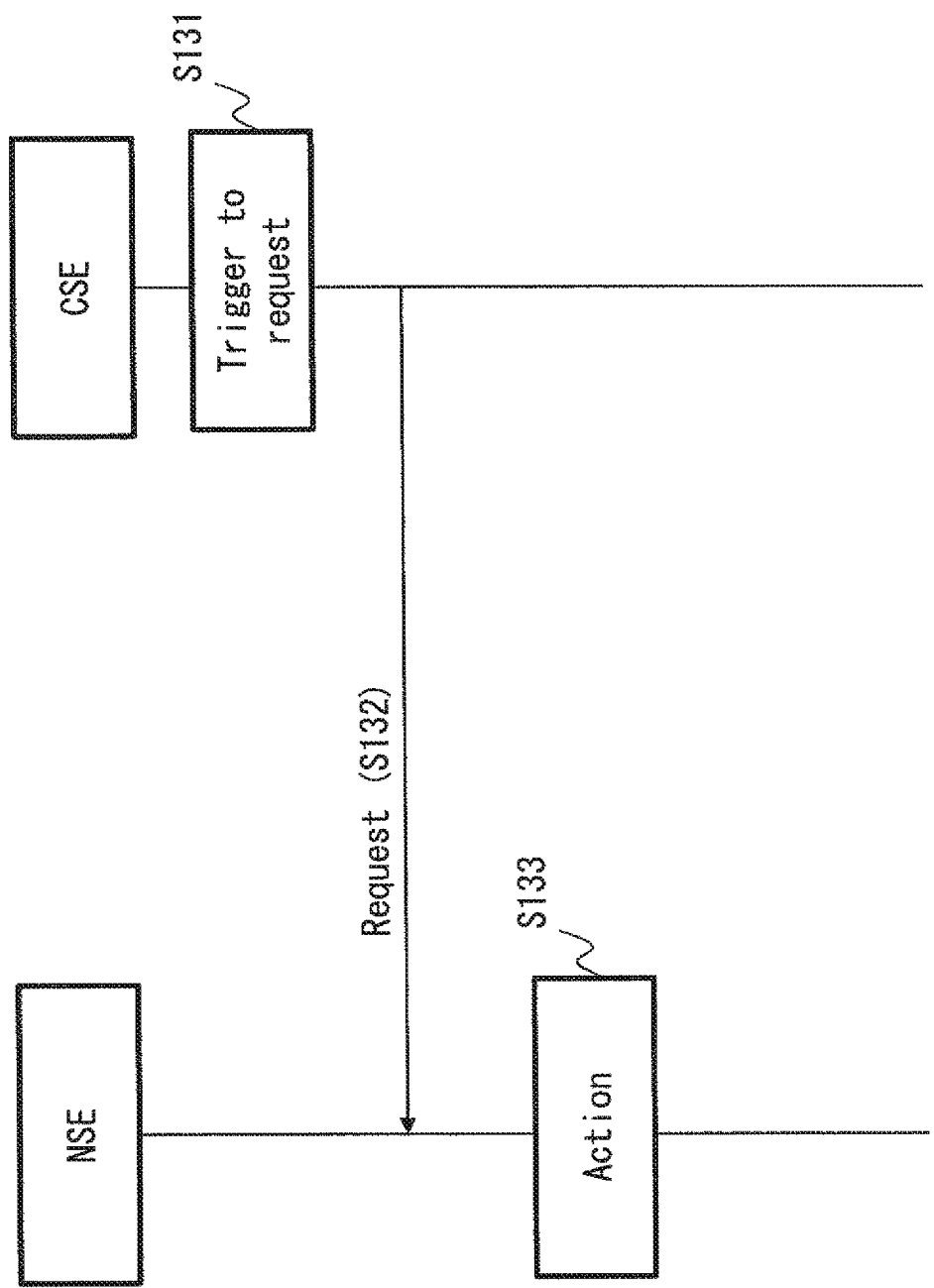
FIG. 17 is a diagram for describing a service request procedure via the Z Reference Point according to the second exemplary embodiment.

Next, with reference to FIG. 17, a service request procedure via the Z Reference Point will be described. First, the CSE 50 determines to transmit a Request message when the resources are updated, for example (S131). Next, the CSE 50 transmits the Request message to the NSE 60. Next, the NSE 60 executes the service that has been instructed based on the Request message (S133).

Figure 18:
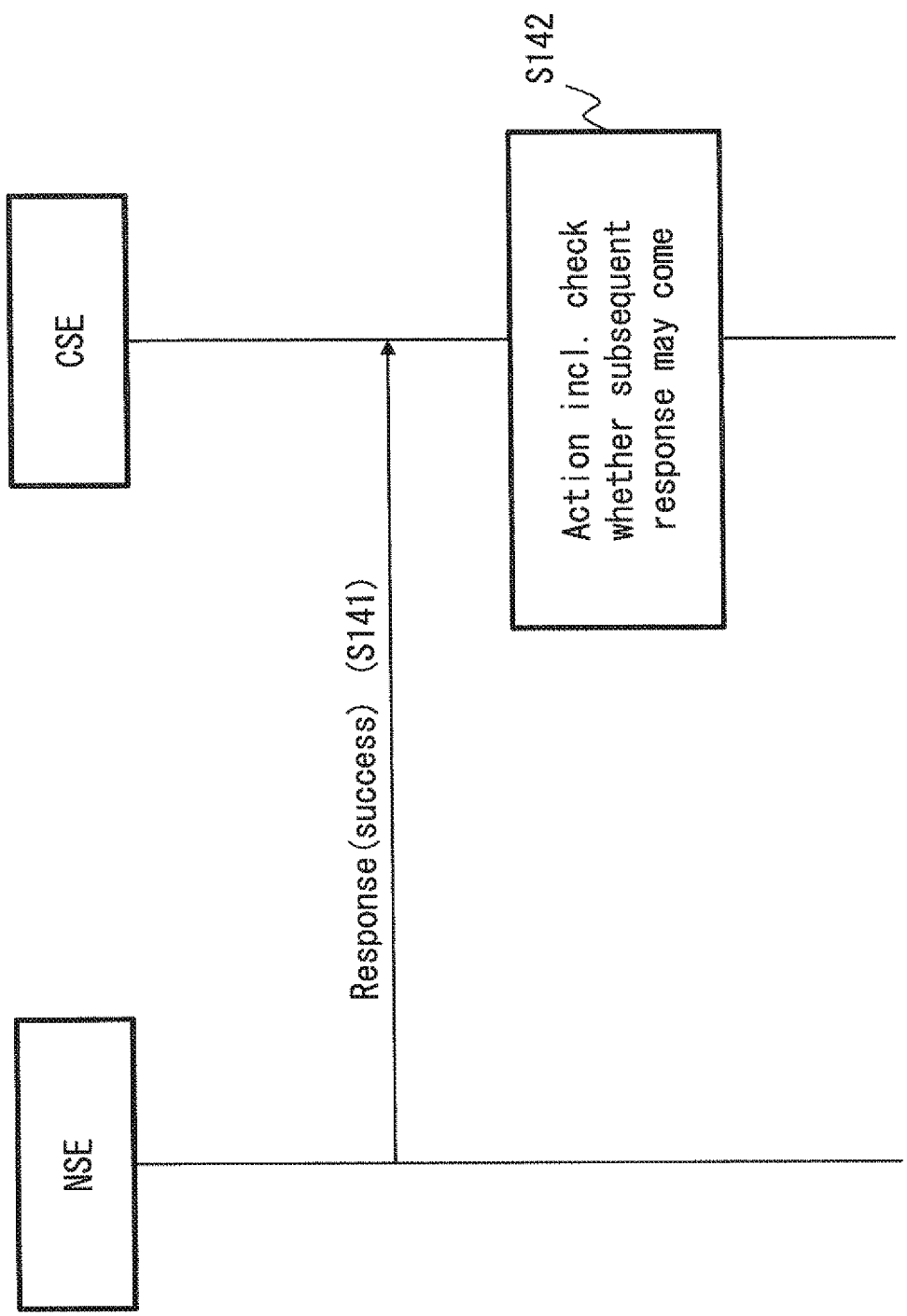
FIG. 18 is a diagram for describing a flow of processing when a service has been successfully executed according to the second exemplary embodiment.

Next, with reference to FIG. 18, processing when the service has been successfully executed will be described. First, the NSE 60 transmits a Response message to the CSE 50 (S141). The information indicating that the service has been successfully executed is set in the Response message. Next, the CSE 50 determines whether another Response message has been sent (S142).

Figure 19:
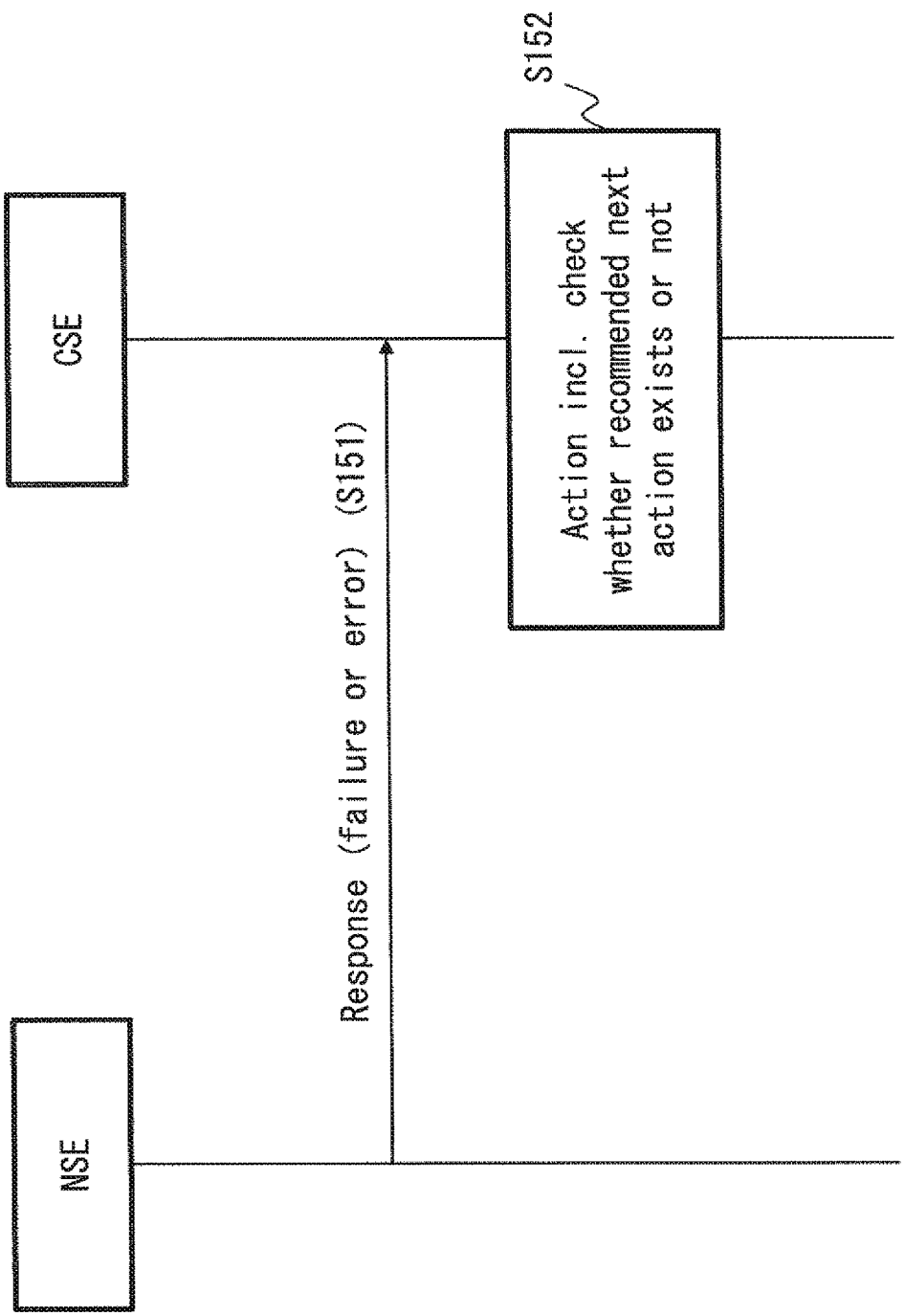
FIG. 19 is a diagram for describing a flow of processing when the service has not been successfully executed according to the second exemplary embodiment.

Next, with reference to FIG. 19, processing when the service has not been successfully executed will be described. First, the NSE 60 transmits a Response message to the CSE 50 (S151). The information indicating that the service has not been successfully executed is set in the Response message. Next, the CSE 50 determines whether execution of the next service is instructed (S152).

Figure 20:
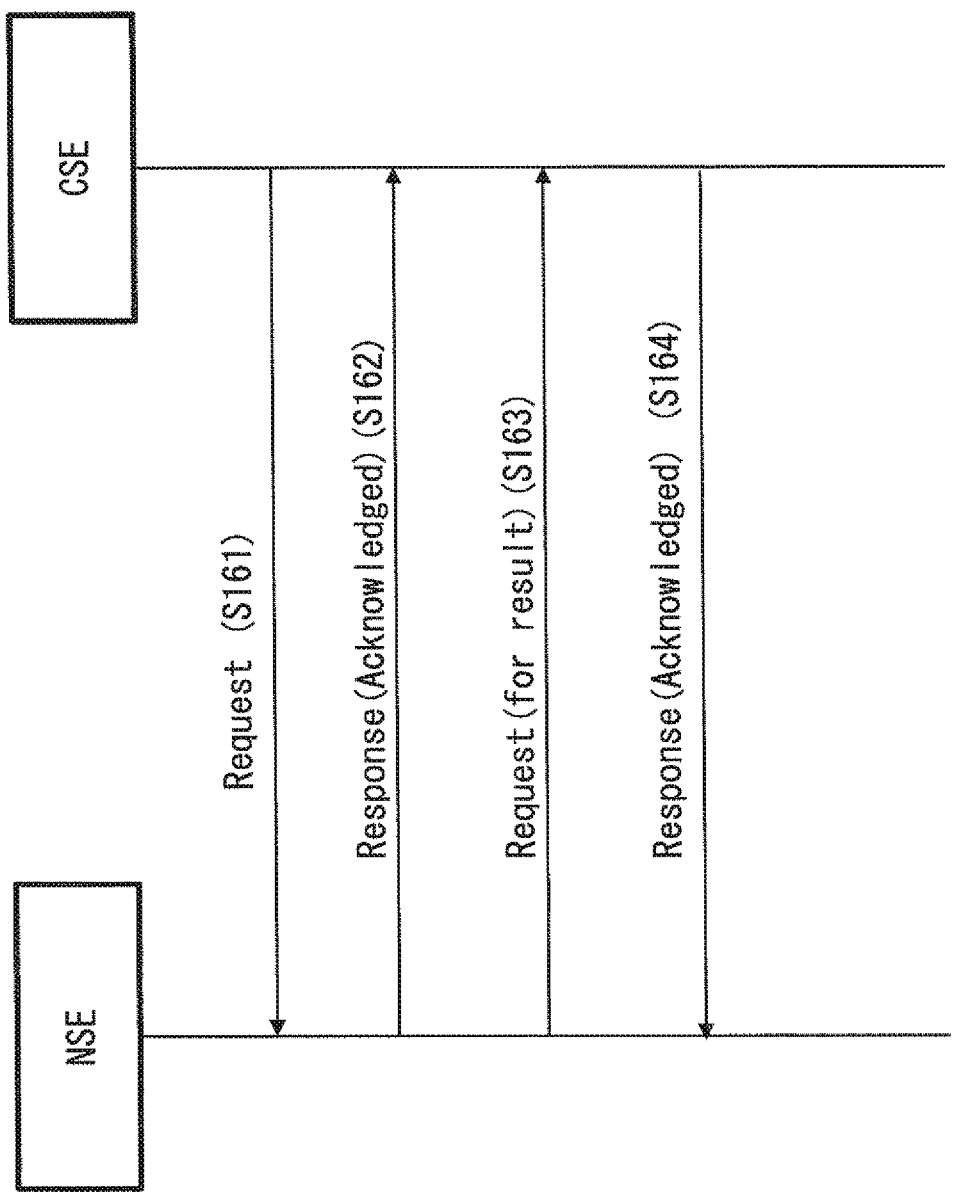
FIG. 20 is a diagram for describing a flow of asynchronous response processing in response to a request for executing the service according to the second exemplary embodiment.

Next, with reference to FIG. 20, a flow of asynchronous response processing in response to a request for executing the service will be described. First, the CSE 50 transmits a Request message to the NSE 60 (S161). Next, the NSE 60 transmits a Response message as a response signal in response to the Request message (S162). Then, the NSE 60 transmits a Request message as a response message regarding the result of executing the service based on the Request message transmitted in Step S161 (S163). Next, the CSE 50 transmits a Response message to the NSE 60 as a response message in response to the Request message transmitted in Step S163 (S164).

Figure 21:
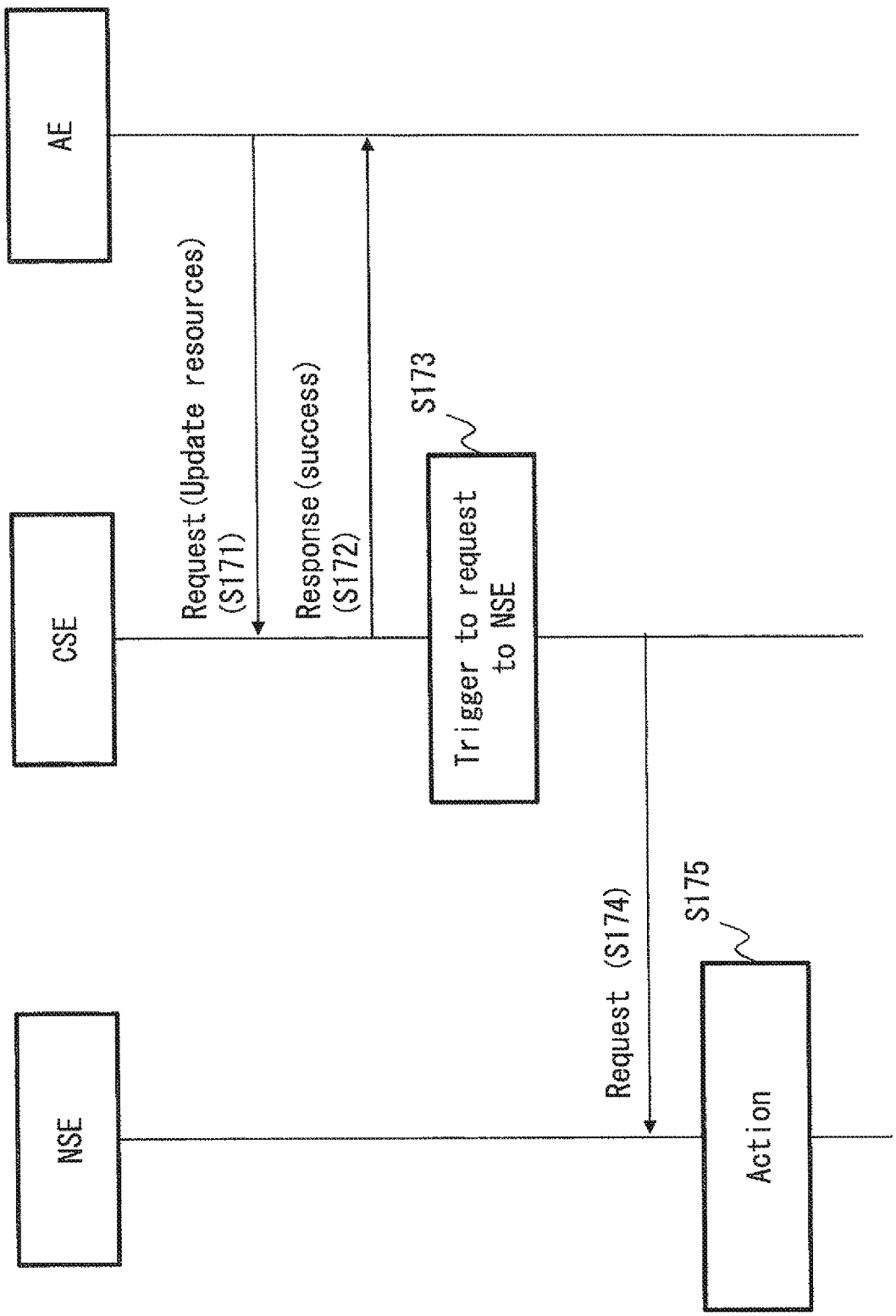
FIG. 21 is a diagram for describing a flow of processing when an AE updates resources of an CSE according to the second exemplary embodiment.

Next, with reference to FIG. 21, a flow of processing when the AE updates the resources of the CSE will be described. First, the AE 40 transmits a Request message to the CSE 50 to update the resources held by the CSE (S171). The resources held by the CSE are, for example, sub-resources included in the serviceExposure resource. Next, the CSE 50 transmits a Response message to the AE 40 as a response message (S172).

Next, the CSE 50 determines to transmit the Request message to the NSE 60 when the resources held by the CSE 50 are updated (S173). Next, the CSE 50 transmits the Request message to the NSE 60 (S174). Next, the NSE 60 executes the service that has been instructed based on the Request message (S175).

Figure 22:
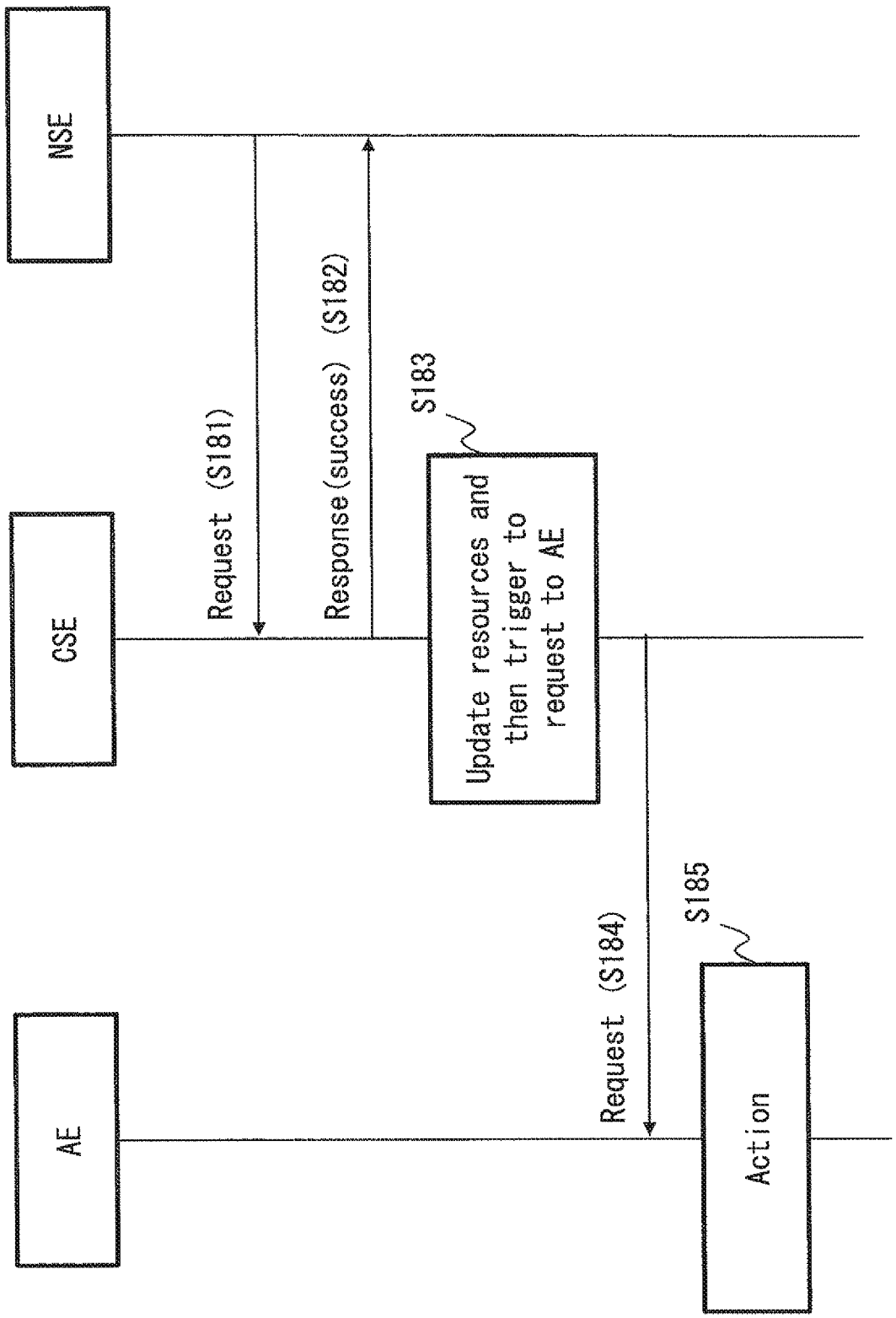
FIG. 22 is a diagram for describing a flow of processing when an NSE 60 requests an CSE 50 to update resources according to the second exemplary embodiment.

Next, with reference to FIG. 22, a flow of processing when the NSE 60 has requested the CSE 50 to update the resources will be described. First, the NSE 60 transmits a Request message to request the CSE 50 to update the resources (S181). While the AE 40 has transmitted the Request message to directly update the resources held by the CSE in FIG. 21, the NSE 60 transmits the Request message to request the update of the resources in the CSE 50 instead of directly updating the resources held by the CSE 50.

Next, the CSE 50 transmits a Response message to the NSE 60 (S182). Then, the CSE 50 updates the resources that it holds based on the Request message in Step S181 and determines to transmit the Request message to the AE 40 (S183). Next, the CSE 50 transmits the Request message to the AE 40 (S184). After that, the AE 40 executes the service that has been instructed based on the Request message (S185). The processing in FIG. 22 is executed, for example, when it has been set in advance in the AE 40 that a notification regarding changes in the resources should be sent to the AE when there are changes in the resources of the CSE.

Figure 23:
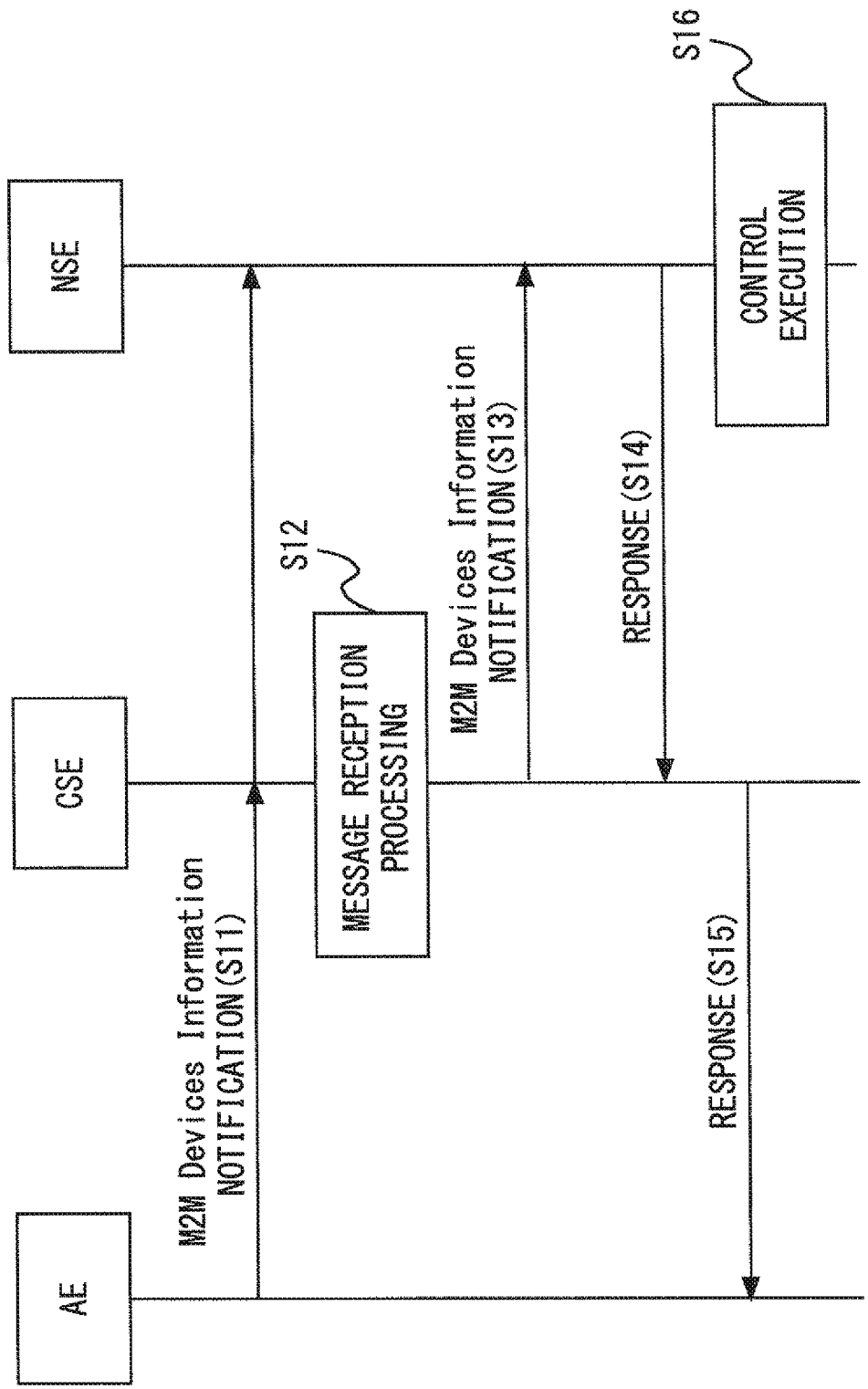
FIG. 23 is a diagram for describing a flow of parameter change processing according to a third exemplary embodiment.

Next, with reference to FIG. 23, a flow of parameter change processing according to the third exemplary embodiment of the present invention will be described. First, the AE 60 transmits an M2M Devices Information notification message to the CSE 70 (S11). Next, upon receiving the M2M Devices Information notification message transmitted from the AE 60, the CSE 70 executes M2M Devices Information notification message reception processing (S12). The M2M Devices Information notification message reception processing includes processing for authenticating the AE 60 in the CSE 70. The M2M Devices Information notification message reception processing in Step S12 will be described later in detail.

Next, when the CSE 70 authenticates that the AE 60 is the AE that has been allowed in advance to connect to the CSE 70, it transmits the M2M Devices Information notification message to the NSE 80 (S13).

Next, upon receiving the M2M Devices Information notification message transmitted from the CSE 70, the NSE 80 transmits a response message to the CSE 70 (S14). Upon receiving the response message transmitted from the NSE 80, the CSE 70 transmits the response message in response to the M2M Devices Information notification message transmitted in Step S11 (S15).

Upon receiving the response message in Step S14, the NSE 60 executes processing for changing the parameters related to the communication terminal that has been specified (S16).

Figure 24:
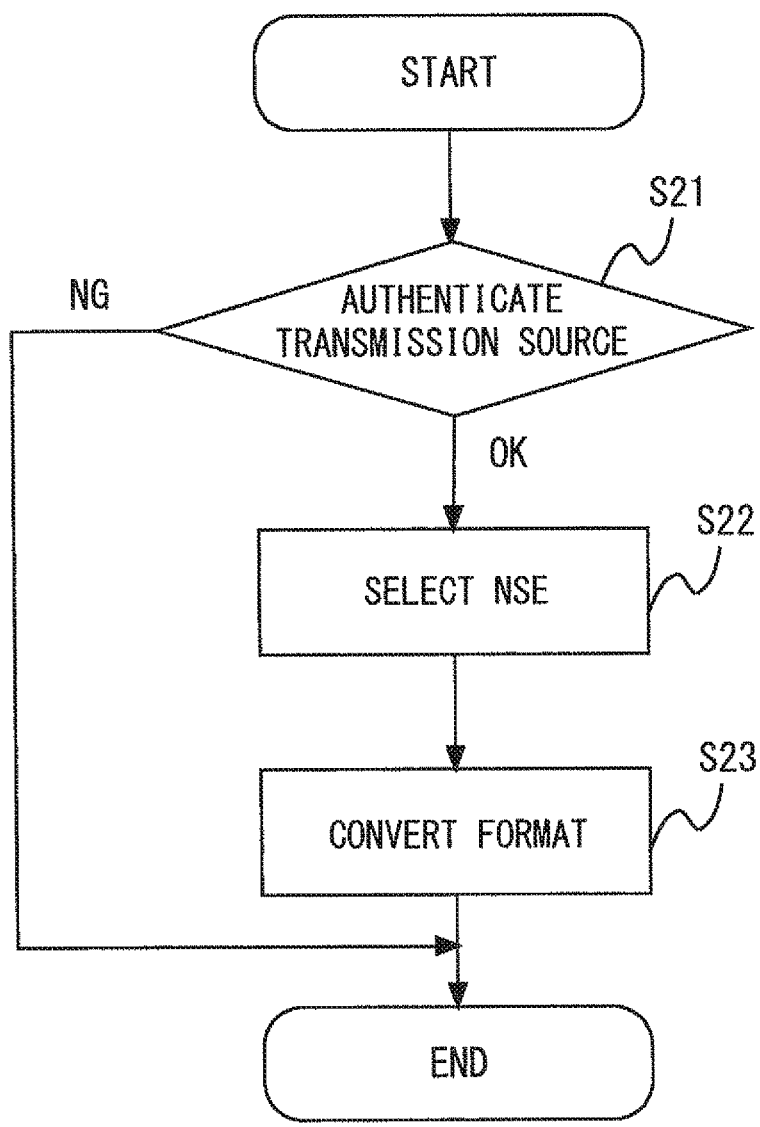
FIG. 24 is a diagram for describing a flow of message reception processing according to the third exemplary embodiment.

Next, with reference to FIG. 24, a flow of the M2M Devices Information notification message reception processing according to the third exemplary embodiment of the present invention will be described. First, the CSE 70 receives the M2M Devices Information notification message transmitted from the AE 60 and then performs authentication regarding the AE 60 that has transmitted the M2M Devices Information notification message (S21). Specifically, the CSE 70 determines whether the AE 60 is an AE that has been allowed in advance to connect to the CSE 70. The CSE 70 may hold list information regarding the AEs that have been allowed in advance to connect to the CSE 70. The CSE 70 may determine whether the AE 60 is included in the list information.

When it is determined that the AE 60 is not included in the list information (authentication NG), the CSE 70 ends the processing. When it is determined that the AE 60 is included in the list information, the CSE 70 selects the NSE to which the M2M Devices Information notification message will be transmitted (S22). The CSE 70 selects, for example, the NSE that holds the parameters regarding the terminal specified in the M2M Devices Information notification message. Further, when there is only one NSE that is connected to the CSE 70, this step may be skipped.

Next, upon selecting the NSE 80, the CSE 70 changes the format of the M2M Devices Information notification message transmitted from the AE 60 to a format used in the NSE 80 that has been selected. Here, the format used in the NSE 80 is defined to be the Z Reference Point. The Z Reference Point defines the common format and the M2M Devices Information format that define the necessary information item when the M2M Devices Information notification message is transmitted from the CSE 70 to the NSE 80.

As described above, the communication network according to the third exemplary embodiment of the present invention defines the X Reference Point between the AE 60 and the CSE 70 and the Z Reference Point between the CSE 70 and the NSE 80. Accordingly, upon acquiring the information regarding the behavior of the terminal from the communication terminal 50, the AE 60 is able to notify the NSE 80 of the information regarding the behavior of the terminal via the CSE 70. The NSE 80 is able to change the parameters regarding the communication terminal 50 to optimize them by acquiring the information regarding the behavior of the terminal.

Fourth Exemplary Embodiment

Figure 25:
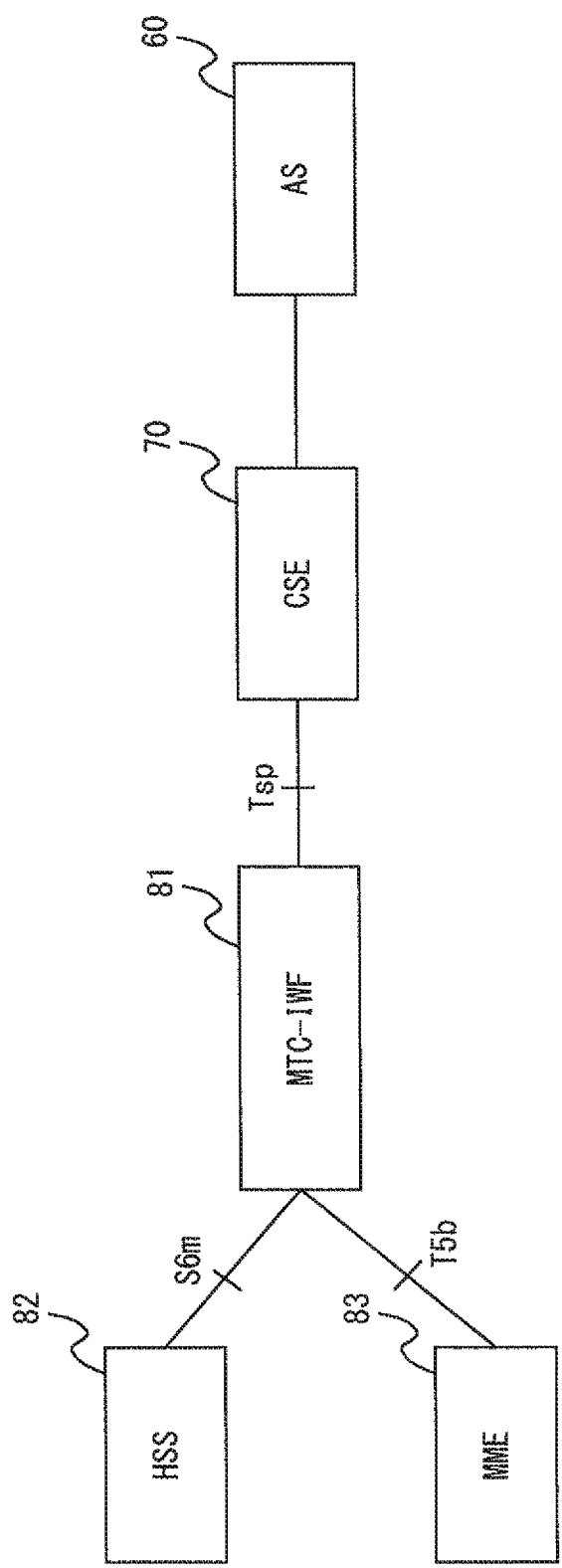
FIG. 25 is a configuration diagram of a communication network according to a fourth exemplary embodiment.

Next, with reference to FIG. 25, a configuration example of a communication network according to a fourth exemplary embodiment of the present invention will be described. In FIG. 25, a detailed configuration example regarding the NSE 80 in FIG. 5 is mainly described. In FIG. 25, the configuration example in which the CSE 70 is connected to the mobile communication network formed using the node apparatus defined in the 3GPP will be described.

The communication network shown in FIG. 25 includes an AE 60, a CSE 70, a Machine Type Communication (MTC)-InterWorking Function (IWF) entity 81, a Home Subscriber Server (HSS) 82, and a Mobility Management Entity (MME) 83. Since the AE 60 and the CSE 70 are similar to those shown in FIG. 5, the detailed descriptions thereof will be omitted.

The MTC-IWF entity 81 acquires a message transmitted from the CSE 70. The MTC-IWF entity 81 specifies the parameters to be changed regarding the communication terminal 50 based on the information regarding the behavior of the communication terminal 50 set in the received message.

The HSS 82 holds subscriber information regarding the communication terminal 50. The subscriber information may include, for example, contract information, positional information or the like regarding the communication terminal 50. The HSS 82 changes the parameters regarding the communication terminal 50 held by the HSS 82 upon receiving an instruction to change the parameters regarding the communication terminal 50 from the MTC-IWF entity 81.

The MME 83 performs mobility management of the communication terminal 50. For example, the MME 83 manages the position registration area of the communication terminal 50 and further controls the path or the like of user data transmitted and received by the communication terminal 50. Upon receiving the instruction to change the parameters regarding the communication terminal 50 from the MTC-IWF entity 81, the HSS 82 changes the parameters regarding the communication terminal 50 held in the HSS 82.

Further, Tsp is an interface defined between the CSE 70 and the MTC-IWF entity 81, S6$m$ is an interface defined between the MTC-IWF entity 81 and the HSS 82, and T5$b$ is an interface defined between the MTC-IWF entity 81 and the MME 83. The specifications and the like of Tsp, S6$m$, and T5$b$ are defined in the 3GPP.

As described above, by using the communication network according to the fourth exemplary embodiment of the present invention, it is possible to change the parameters related to the communication terminal in the mobile communication network including the node apparatus defined in the 3GPP.

Fifth Exemplary Embodiment

Next, with reference to FIG. 26, a configuration example of a communication network according to a fifth exemplary embodiment of the present invention will be described. The communication network shown in FIG. 26 has a configuration in which the application server 10 is removed from the communication network shown in FIG. 1 and the components other than the application server 10 are similar to those of the communication network shown in FIG. 1.

Figure 26:
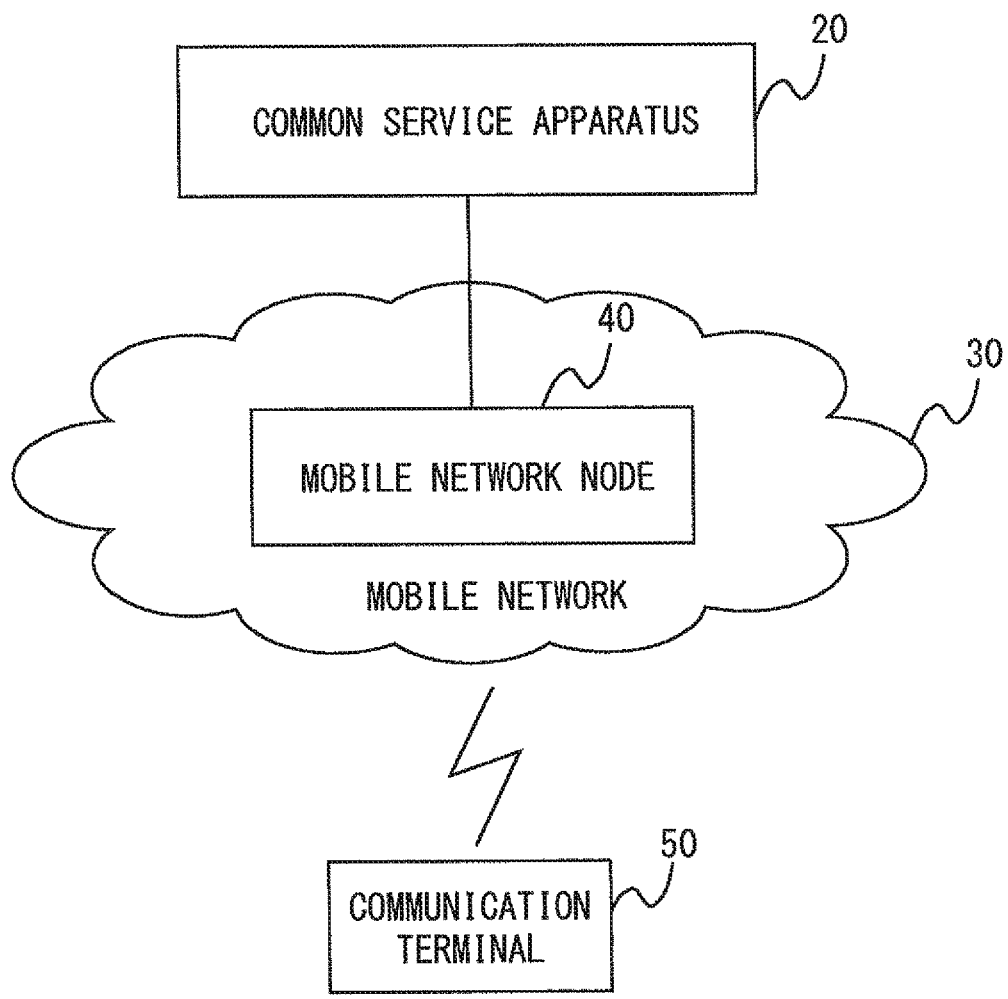
FIG. 26 is a configuration diagram of a communication network according to a fifth exemplary embodiment.

In the communication network shown in FIG. 26, the common service apparatus 20 acquires information regarding the behavior of the communication terminal 50 transmitted from the communication terminal 50. In the communication network shown in FIG. 1, the common service apparatus 20 acquires the information regarding the behavior of the communication terminal 50 via the application server 10. Meanwhile, in the communication network shown in FIG. 26, the common service apparatus 20 acquires information regarding the behavior of the communication terminal 50 from the communication terminal 50.

The common service apparatus 20 may acquire the information regarding the behavior from the communication terminal 50 via the mobile network 30 or may acquire the information regarding the behavior from the communication terminal 50 via another network.

As described above, by using the communication network according to the fifth exemplary embodiment of the present invention, the common service apparatus 20 is able to acquire the information regarding the behavior from the communication terminal 50. That is, the common service apparatus 20 is also able to directly acquire the information regarding the behavior from the communication terminal 50, not via the application server 10. According to this method, the common service apparatus 20 does not need to define any interface between the common service apparatus 20 and the application server 10, whereby it is possible to simplify the configuration of the apparatus compared to FIG. 1.

Further, the common service apparatus 20 may use both the configuration in which the information regarding the behavior of the communication terminal 50 is acquired via the application server 10 and the configuration in which the information regarding the behavior of the communication terminal 50 is directly acquired from the communication terminal 50.

While the present invention has been described as a hardware configuration in the above exemplary embodiments, the present invention is not limited to this configuration. The present invention can achieve the processing in the common service apparatus 20 and the mobile network node 40 by causing a central processing unit (CPU) to execute a computer program.

In the above examples, the program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present invention is not limited to the above exemplary embodiments and may be changed as appropriate without departing from the spirit of the present invention.

While the present invention has been described with reference to the exemplary embodiments, the present invention is not limited to the above exemplary embodiments. Various changes that can be understood by those skilled in the art can be made to the configurations and the details of the present invention within the scope of the present invention.

This application is based upon and claims the benefit of priority from Japanese Patent Application No. 2013-202773, filed on Sep. 27, 2013, the disclosure of which is incorporated herein in its entirety by reference.

REFERENCE SIGNS LIST

10 APPLICATION SERVER
11 BEHAVIOR MANAGEMENT UNIT
20 COMMON SERVICE APPARATUS
21 COMMUNICATION UNIT
22 AUTHENTICATION UNIT
30 MOBILE NETWORK
40 MOBILE NETWORK NODE
41 PARAMETER MANAGEMENT UNIT
50 COMMUNICATION TERMINAL
60 AE
70 CSE
75 CSFs
80 NSE
81 MTC-IWF ENTITY
82 HSS
83 MME

The invention claimed is:

1. A method performed by a first node comprising:
receiving an identifier of a user equipment (UE) and information indicating communication characteristics of the UE from an application server of an external party;
authorizing the application server to send the information; and
transmitting the information to a network node, if the application server is authorize;
wherein the information is used to determine a parameter value which aids optimization of behavior of the UE.

2. The method according to claim 1, wherein the information further indicates movement of the UE.

3. The method according to claim 2, wherein the information identifies a planned path of the movement of the UE.

4. The method according to claim 2, wherein the information identifies a mobility state of the UE of whether the UE is stationary or mobile.

5. A method performed by a network node comprising:
receiving an information indicating communication characteristics of a user equipment (UE) from a first node,
wherein an identifier of the UE and the information is sent from an application server of an external party to the first node, and
the information is sent from the first node to the network node if the application server is authorized, by the first node, to send the information; and
determining a parameter value which aids optimization of behavior of the UE based on the information.

6. The method according to claim 5, wherein the information further indicates movement of the UE.

7. The method according to claim 6, wherein the information identifies a planned path of the movement of the UE.

8. The method according to claim 6, wherein the information identifies a mobility state of the UE of whether the UE is stationary or mobile.

9. The method according to claim 5, wherein the information is used to determine the parameter value.

* * * * *